United States Patent
Odani et al.

(10) Patent No.: US 8,945,780 B2
(45) Date of Patent: Feb. 3, 2015

(54) NONAQUEOUS ELECTROLYTE AND NONAQUEOUS ELECTROLYTE BATTERY

(75) Inventors: Toru Odani, Fukushima (JP); Tadahiko Kubota, Kanagawa (JP)

(73) Assignee: Sony Corporation, Tokyo (JP)

( * ) Notice: Subject to any disclaimer, the term of this patent is extended or adjusted under 35 U.S.C. 154(b) by 875 days.

(21) Appl. No.: 13/004,477

(22) Filed: Jan. 11, 2011

(65) Prior Publication Data

US 2011/0183218 A1  Jul. 28, 2011

(30) Foreign Application Priority Data

Jan. 25, 2010  (JP) ................. P2010-012839

(51) Int. Cl.
| | |
|---|---|
| H01M 6/16 | (2006.01) |
| H01M 10/052 | (2010.01) |
| H01M 10/0567 | (2010.01) |
| H01M 10/0568 | (2010.01) |
| H01M 10/0569 | (2010.01) |
| H01M 10/42 | (2006.01) |

(52) U.S. Cl.
CPC ............ *H01M 10/052* (2013.01); *H01M 6/164* (2013.01); *H01M 10/0567* (2013.01); *H01M 10/0568* (2013.01); *H01M 10/0569* (2013.01); *H01M 10/4235* (2013.01); *H01M 2300/0025* (2013.01); *H01M 2300/0034* (2013.01); *H01M 2300/0037* (2013.01); *Y02E 60/122* (2013.01)
USPC .......................................... 429/338; 429/342

(58) Field of Classification Search
None
See application file for complete search history.

(56) References Cited

U.S. PATENT DOCUMENTS

2008/0138715 A1* 6/2008 Ihara et al. .................... 429/338

FOREIGN PATENT DOCUMENTS

| JP | 8-511274 | 11/1996 |
|---|---|---|
| JP | 2004-165151 | 6/2004 |
| JP | 2009-70636 | 4/2009 |

OTHER PUBLICATIONS

STIC search dated Sep. 18, 2013.*

* cited by examiner

*Primary Examiner* — Sarah A Slifka
(74) *Attorney, Agent, or Firm* — K&L Gates LLP

(57) ABSTRACT

A nonaqueous electrolyte includes: a nonaqueous solvent containing 0.1% by volume or more and not more than 50% by volume of at least one member selected from the group consisting of a halogen element-containing chain carbonate represented by the following formula (1) and a halogen element-containing cyclic carbonate represented by the following formula (2); and an electrolyte salt containing a compound represented by the following formula (3) in an amount of 0.001 moles/L or more and not more than 0.5 moles/L relative to the nonaqueous solvent 9 Claims, 4 Drawing Sheets

NONAQUEOUS ELECTROLYTE AND NONAQUEOUS ELECTROLYTE BATTERY

CROSS REFERENCES TO RELATED APPLICATIONS

The present application claims priority to Japanese Priority Patent Application JP 2010-012839 filed in the Japan Patent Office on Jan. 25, 2010, the entire contents of which is hereby incorporated by reference.

BACKGROUND

The present application relates to a nonaqueous electrolyte and a nonaqueous electrolyte battery. In particular, the present application relates to a nonaqueous electrolyte and a nonaqueous electrolyte battery capable of keeping excellent battery characteristics under a low temperature environment and a high temperature environment.

In recent years, a number of portable electronic appliances such as a camera-integrated VTR, a digital still camera, a mobile phone, a personal digital assistant and a laptop computer have appeared, and it is contrived to achieve downsizing and weight reduction thereof. With respect to batteries, in particular, secondary batteries as a portable power source for such an electronic appliance, research and development have been actively conducted for the purpose of enhancing the energy density. Above all, lithium ion secondary batteries using carbon for a negative electrode active material, a lithium transition metal complex oxide for a positive electrode active material and a carbonate mixture for an electrolytic solution are proposed. Such batteries are widely put into practical use because a large energy density is obtained as compared with lead batteries and nickel cadmium batteries which are a nonaqueous electrolytic solution secondary battery of the related art. In particular, recently, it is contrived to modify the positive electrode active material or to enhance the charge voltage for the purpose of realizing a higher capacity.

In such batteries with a high capacity, the portability is enhanced by downsizing of electronic appliances, and an opportunity of use upon being brought out outdoors increases. That is, it may be considered that the electronic appliances are used under a low temperature environment and a high temperature environment. When placed in a charged state under a high temperature environment, a positive electrode is deteriorated due to a reaction between an electrolytic solution and a positive electrode active material on the surface of the positive electrode, resulting in a lowering of the capacity after long-term storage. Also, when placed under a low temperature environment, the ion conductivity is lowered, resulting in a lowering of the capacity.

Then, in order to solve these problems, Patent Document 1 (JP-T-8-511274) describes the use of lithium bis(fluorosulfonyl)imide (LiFSI) as an electrolyte salt. Patent Document 2 (JP-A-2004-165151) reports that when an electrolytic solution containing a lactone as a solvent and lithium bis(fluorosulfonyl)imide (LiFSI) as an electrolyte salt is used, the stability is excellent at high temperatures or during storage. Patent Document 2 also reports that the stability is more enhanced by using, as an additive, vinylene carbonate, vinyl ethylene carbonate, phenyl ethylene carbonate or propanesultone. Patent Document 3 (JP-A-2009-70636) discloses a battery containing a quaternary ammonium cation and containing a (fluorosulfonyl)imide (FSI) anion and an inorganic anion.

SUMMARY

However, in the methods described in Patent Documents 1 to 3, it is difficult to keep good battery characteristics under both a low temperature environment and a high temperature environment. Thus, it is desirable to provide a nonaqueous electrolyte and a nonaqueous electrolyte battery having a high battery capacity under a low temperature environment and a high temperature environment.

According to an embodiment, there is provided a nonaqueous electrolyte including:

a nonaqueous solvent containing 0.1% by volume or more and not more than 50% by volume of at least one member selected from the group consisting of a halogen element-containing chain carbonate represented by the following formula (1) and a halogen element-containing cyclic carbonate represented by the following formula (2); and an electrolyte salt containing a compound represented by the following formula (3) in an amount of 0.001 moles/L or more and not more than 0.5 moles/L relative to the nonaqueous solvent.

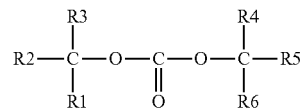

(In the formula (1), each of R1 to R6 represents a hydrogen group, a halogen group, an alkyl group or a halogenated alkyl group, provided that at least one of R1 to R6 represents a halogen group or a halogenated alkyl group.)

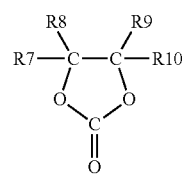

(In the formula (2), each of R7 to R10 represents a hydrogen group, a halogen group, an alkyl group or a halogenated alkyl group, provided that at least one of R7 to R10 represents a halogen group or a halogenated alkyl group.)

$$M^+[(ZY)_2N]^- \quad (3)$$

(In the formula (3), M represents a monovalent cation; Y represents $SO_2$ or CO; and each Z independently represents a fluorine atom or an organic group which may contain at least one polymerizable functional group and which may be perfluorinated, provided that at least one Z represents a fluorine atom.)

According to another embodiment, there is provided a nonaqueous electrolyte battery including a positive electrode, a negative electrode and an nonaqueous electrolyte, wherein the nonaqueous electrolyte includes a nonaqueous solvent containing 0.1% by volume or more and not more than 50% by volume of at least one member selected from the group consisting of a halogen element-containing chain carbonate represented by the following formula (1) and a halogen element-containing cyclic carbonate represented by the following formula (2); and an electrolyte salt containing a compound represented by the following formula (3) in an amount of 0.001 moles/L or more and not more than 0.5 moles/L relative to the nonaqueous solvent.

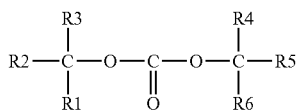
(1)

(In the formula (1), each of R1 to R6 represents a hydrogen group, a halogen group, an alkyl group or a halogenated alkyl group, provided that at least one of R1 to R6 represents a halogen group or a halogenated alkyl group.)

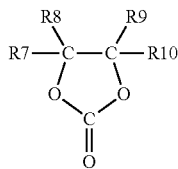
(2)

(In the formula (2), each of R7 to R10 represents a hydrogen group, a halogen group, an alkyl group or a halogenated alkyl group, provided that at least one of R7 to R10 represents a halogen group or a halogenated alkyl group.)

$$M^+[(ZY)_2N]^- \quad (3)$$

(In the formula (3), M represents a monovalent cation; Y represents $SO_2$ or CO; and each Z independently represents a fluorine atom or an organic group which may contain at least one polymerizable functional group and which may be perfluorinated, provided that at least one Z represents a fluorine atom.)

It is preferable that the compound represented by the formula (3) is at least one member selected from the group consisting of lithium bis(fluorosulfonyl)imide represented by the following formula (4) and lithium (fluorosulfonyl)(trifluoromethylsulfonyl)imide represented by the following formula (5).

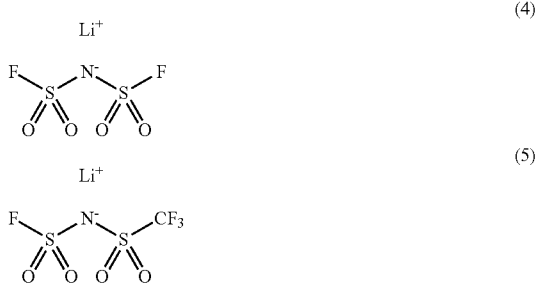

According to an embodiment, a film forming effect on the electrode surface is high, and a firmer and more stable film is formed by the electrode surface.

According an embodiments of the present application, it is possible to suppress a lowering of the battery capacity to be caused following the progress of cycles under a low temperature environment and a high temperature environment. Also, it is possible to suppress the decomposition of the nonaqueous electrolyte, thereby making the generation of a gas occur hardly.

Additional features and advantages are described herein, and will be apparent from the following Detailed Description and the figures.

DETAILED DESCRIPTION

Figure 1:
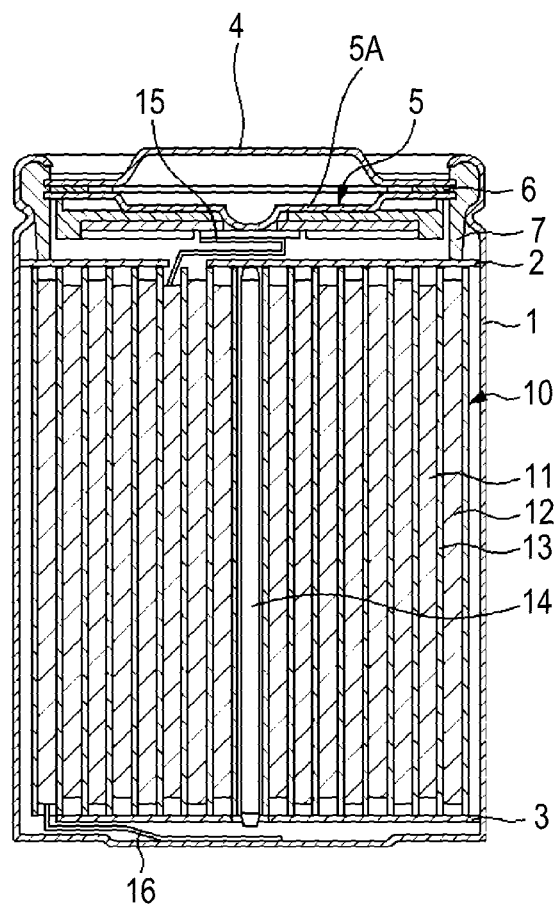
FIG. 1 is a sectional view showing a configuration example of a nonaqueous electrolyte battery according to a second embodiment.

Embodiments of the present application will be described below in detail with reference to the drawings.

1. First embodiment (configuration of nonaqueous electrolyte)

2. Second embodiment (example of cylinder type nonaqueous electrolyte battery)

3. Third embodiment (example of laminate type nonaqueous electrolyte battery)

4. Fourth embodiment (example of coin type nonaqueous electrolyte battery)

1. First Embodiment (1-1) Configuration of Nonaqueous Electrolyte

The nonaqueous electrolyte according to a first embodiment is composed of a nonaqueous solvent containing a halogen element-containing carbonate and an electrolyte salt containing an imide salt. The nonaqueous solvent and the electrolyte salt are hereunder described in detail.

Nonaqueous Solvent

Halogen Element-Containing Carbonate

The nonaqueous solvent according to the first embodiment contains at least one member selected from the group consisting of a halogen element-containing chain carbonate represented by the following formula (1) and a halogen element-containing cyclic carbonate represented by the following formula (2).

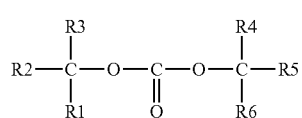
(1)

(In the formula (1), each of R1 to R6 represents a hydrogen group, a halogen group, an alkyl group or a halogenated alkyl group, provided that at least one of R1 to R6 represents a halogen group or a halogenated alkyl group.)

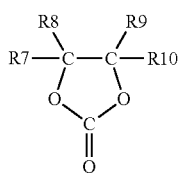

(2)

(In the formula (2), each of R7 to R10 represents a hydrogen group, a halogen group, an alkyl group or a halogenated alkyl group, provided that at least one of R7 to R10 represents a halogen group or a halogenated alkyl group.)

R1 to R6 in the formula (1) may be the same as or different from each other. This matter is also applicable to R7 to R10 in the formula (2).

In the formulae (1) and (2), though the kind of the halogen is not particularly limited, for example, at least one member selected from the group consisting of fluorine (F), chlorine (Cl) and bromine (Br) can be exemplified. Of these, fluorine (F) is preferable. This is because a higher effect is obtainable. As a matter of course, other halogen may be used.

The halogen number is preferably 2 rather than 1, and may be 3 or more. This is because when used for electrochemical devices such as secondary batteries, capability for forming a protective film on the electrode surface becomes high, and a firmer and more stable protective film is formed, so that the decomposition reaction of an electrolytic solution is more suppressed.

Examples of the halogen element-containing chain carbonate represented by the formula (1) include fluoromethyl methyl carbonate (FDMC), bis(fluoromethyl) carbonate (DFDMC) and difluoromethyl methyl carbonate. These materials may be used singly or in admixture of plural kinds thereof.

Examples of the halogen element-containing cyclic carbonate represented by the formula (2) include 4-fluoro-1,3-dioxolan-2-one (FEC), 4-chloro-1,3-dioxolan-2-one, 4,5-difluoro-1,3-dioxolan-2-one (DFEC), tetrafluoro-1,3-dioxolan-2-one, 4-chloro-5-fluoro-1,3-dioxolan-2-one, 4,5-dichloro-1,3-dioxolan-2-one, tetrachloro-1,3-dioxolan-2-one, 4,5-bistrifluoromethyl-1,3-dioxolan-2-one, 4-trifluoromethyl-1,3-dioxolan-2-one, 4,5-difluoro-4,5-dimethyl-1,3-dioxolan-2-one, 4,4-difluoro-5-methyl-1,3-dioxolan-2-one, 4-ethyl-5,5-difluoro-1,3-dioxolan-2-one, 4-fluoro-5-trifluoromethyl-1,3-dioxolan-2-one, 4-methyl-5-trifluoromethyl-1,3-dioxolan-2-one, 4-fluoro-4,5-dimethyl-1,3-dioxolan-2-one, 5-(1,1-difluoroethyl)-4,4-difluoro-1,3-dioxolan-2-one, 4,5-dichloro-4,5-dimethyl-1,3-dioxolan-2-one, 4-ethyl-5-fluoro-1,3-dioxolan-2-one, 4-ethyl-4,5-difluoro-1,3-dioxolan-2-one, 4-ethyl-4,5,5-trifluoro-1,3-dioxolan-2-one and 4-fluoro-4-methyl-1,3-dioxolan-2-one. These materials may be used singly or in admixture of plural kinds thereof.

Of these, 4-fluoro-1,3-dioxolan-2-one (FEC) or 4,5-difluoro-1,3-dioxolan-2-one (DFEC) is preferable, and 4,5-difluoro-1,3-dioxolan-2-one (DFEC) is more preferable. In particular, as to 4,5-difluoro-1,3-dioxolan-2-one (DFEC), the trans isomer is more preferable than the cis isomer. This is because not only the trans isomer is easily available, but high effects are obtainable.

It is preferable that the halogen element-containing carbonate represented by the formulae (1) and/or (2) is contained in an amount in the range of 0.1% by volume or more and not more than 50% by volume relative to the whole of the non-aqueous solvent. When the mixing amount of the halogen element-containing carbonate is too small, an effect for forming a stable film is low. On the other hand, when the mixing amount of the halogen element-containing carbonate is too large, an effect for forming a stable film is low especially under a low temperature environment.

Other Nonaqueous Solvent

A nonaqueous solvent which is generally used for nonaqueous electrolyte batteries is used together with the foregoing halogen element-containing carbonate.

For example, ethylene carbonate (EC), propylene carbonate (PC), butylene carbonate (BC), dimethyl carbonate (DMC), diethyl carbonate (DEC), ethyl methyl carbonate (EMC), methyl propyl carbonate (MPC), γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, methyl trimethylacetate, ethyl trimethylacetate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, dimethyl sulfoxide and so on can be used. This is because excellent capacity, cycle characteristics and storage characteristics are obtainable in electrochemical devices provided with an electrolytic solution, such as batteries. These materials may be used singly or in admixture of plural kinds thereof.

Above all, it is preferable to use one containing, as the solvent, at least one member selected from the group consisting of ethylene carbonate (EC), propylene carbonate (PC), butylene carbonate (BC), dimethyl carbonate (DMC), diethyl carbonate (DEC) and ethyl methyl carbonate (EMC). This is because sufficient effects are obtainable.

Also, it is more preferable to use a mixture of a cyclic carbonate and a chain carbonate. That is, in particular, it is preferable to use one containing a mixture of ethylene carbonate (EC) or propylene carbonate (PC), each of which is a high viscosity (high dielectric constant) solvent (for example, specific dielectric constant $\in \geq 30$), and dimethyl carbonate (DMC), diethyl carbonate (DEC) or ethyl methyl carbonate (EMC), each of which is a low viscosity solvent (for example, viscosity $\leq 1$ mPa·s). This is because dissociation properties of the electrolyte salt and mobility of the ion are enhanced, so that higher effects are obtainable.

The cyclic carbonate and the chain carbonate are mixed in a volume ratio preferably ranging from 1/99 to 55/45, and more preferably ranging from 15/85 to 45/55.

It is preferable that this solvent contains at least one member selected from the group consisting of unsaturated bond-containing cyclic carbonates represented by the following formulae (6) to (8). This is because the chemical stability of the electrolytic solution is more enhanced.

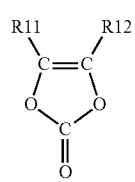

(6)

(In the formula (6), each of R11 and R12 represents a hydrogen group or an alkyl group.)

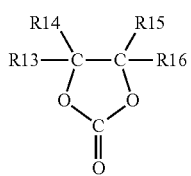

(7)

(In the formula (7), each of R13 to R16 represents a hydrogen group, an alkyl group, a vinyl group or an allyl group, provided that at least one of R13 to R16 represents a vinyl group or an allyl group.)

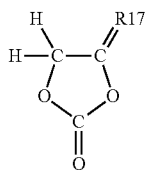

(8)

(In the formula (8), R17 represents an alkylene group.)

The unsaturated bond-containing cyclic carbonate represented by the formula (6) is a vinylene carbonate based compound. Examples of this vinylene carbonate based compound include vinylene carbonate (1,3-dioxol-2-one), methyl vinylene carbonate (4-methyl-1,3-dioxol-2-one), ethyl vinylene carbonate (4-ethyl-1,3-dioxol-2-one), 4,5-dimethyl-1,3-dioxol-2-one, 4,5-diethyl-1,3-dioxol-2-one, 4-fluoro-1,3-dioxol-2-one and 4-trifluoromethyl-1,3-dioxol-2-one. These materials may be used singly or in admixture of plural kinds thereof. Of these, vinylene carbonate is preferable. This is because this material is easily available, and high effects are obtainable.

The unsaturated bond-containing cyclic carbonate represented by the formula (7) is a vinyl ethylene carbonate based compound. Examples of the vinyl ethylene carbonate based compound include vinyl ethylene carbonate (4-vinyl-1,3-dioxolan-2-one), 4-methyl-4-vinyl-1,3-dioxolan-2-one, 4-ethyl-4-vinyl-1,3-dioxolan-2-one, 4-n-propyl-4-vinyl-1,3-dioxolan-2-one, 5-methyl-4-vinyl-1,3-dioxolan-2-one, 4,4-divinyl-1,3-dioxolan-2-one and 4,5-divinyl-1,3-dioxolan-2-one. These materials may be used singly or in admixture of plural kinds thereof. Of these, vinyl ethylene carbonate is preferable. This is because not only this material is easily available, but high effects are obtainable. As a matter of course, as to R13 to R16, all of them may be a vinyl group or an allyl group, or a vinyl group and an allyl group may be mixed together.

The unsaturated bond-containing cyclic carbonate represented by the formula (8) is a methylene ethylene carbonate based compound. Examples of the methylene ethylene carbonate based compound include 4-methylene-1,3-dioxolan-2-one, 4,4-dimethyl-5-methylene-1,3-dioxolan-2-one and 4,4-diethyl-5-methylene-1,3-dioxolan-2-one. These materials may be used singly or in admixture of plural kinds thereof. The methylene ethylene carbonate based compound may also be a compound having two methylene groups in addition to a compound having one methylene group (compound represented by the formula (8)).

The unsaturated bond-containing cyclic carbonate may be a catechol carbonate having a benzene ring, or the like in addition to the compounds represented by the formulae (6) to (8).

Also, the nonaqueous solvent may contain a sultone (cyclic sulfonate) or an acid anhydride. This is because the chemical stability of the electrolytic solution is more enhanced.

Examples of the sultone include propanesultone and propenesultone. These materials may be used singly or in admixture of plural kinds thereof. Of these, propenesultone is preferable. Also, a content of the sulfone in the solvent is preferably 0.5% by weight or more and not more than 3% by weight. This is because in any case, high effects are obtainable.

Examples of the acid anhydride include carboxylic acid anhydrides such as succinic anhydride, glutaric anhydride and maleic anhydride; disulfonic acid anhydrides such as ethanedisulfonic anhydride and propanedisulfonic anhydride; and anhydrides between a carboxylic acid and sulfonic acid, such as sulfobenzoic anhydride, sulfopropionic anhydride and sulfobutyric anhydride. Of these, succinic anhydride and sulfobenzoic anhydride are preferable. The compounds may be used singly or in admixture of plural kinds thereof. Also, a content of the acid anhydride in the solvent is preferably 0.5% by weight or more and not more than 3% by weight. This is because in any case, high effects are obtainable.

Also, it is preferable that an aromatic compound is contained as the nonaqueous solvent. Examples of the aromatic compound include halogenated benzene compounds such as chlorobenzene, chlorotoluene and fluorobenzene; and alkylated aromatic compounds such as tert-butylbenzene, tert-pentylbenzene, cyclohexylbenzene, hydrogenated biphenyl and hydrogenated terphenyl. The alkyl group may be halogenated, and in particular, a fluorinated alkyl group is preferable. Examples thereof include trifluoromethoxybenzene. As other aromatic compounds, optionally substituted anisoles are exemplified. Examples thereof include 2,4-difluoroanisole and 2,2-difluorobenzodioxole.

For example, an intrinsic viscosity of the solvent is preferably not more than 10.0 mPa·s at 25° C. This is because dissociation properties of the electrolyte salt and mobility of the ion can be ensured. For the same reason, an intrinsic viscosity in a state where the electrolyte salt is dissolved in the solvent (namely, an intrinsic viscosity of the electrolytic solution) is preferably not more than 10.0 mPa·s at 25° C.

Electrolyte Salt

The electrolyte salt contains, for example, one or two or more kinds of light metal salts such as a lithium salt and an imide salt.

Imide Salt

As the imide salt, a compound represented by the following formula (3) can be used.

$$M^+[(ZY)_2N]^- \quad (3)$$

(In the formula (3), M represents a monovalent cation; Y represents $SO_2$ or CO; and each Z independently represents a fluorine atom or an organic group which may contain at least one polymerizable functional group and which may be perfluorinated, provided that at least one Z represents a fluorine atom.)

As the compound represented by the formula (3), for example, lithium bis(fluorosulfonyl)imide ($LiN(FSO_2)_2$: LiFSI) represented by the following formula (4) and lithium (fluorosulfonyl)(trifluoromethylsulfonyl)imide ($LiN(FSO_2)(CF_3SO_2)$) represented by the following formula (5) can be used.

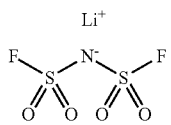

(4)

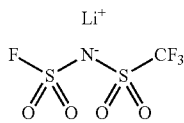

(5)

Such an imide salt forms a film on the electrode surface and suppresses the decomposition of the electrolytic solution, thereby enabling one to suppress a lowering of the battery capacity to be caused following the progress of cycles. Also, the effect for forming a film by this imide salt is good even under a low temperature environment and a high temperature environment, and the effect for suppressing a lowering of the battery capacity can be conspicuously obtained.

It is preferable that such an imide salt is mixed in an amount in the range of 0.001 moles/L or more and not more than 0.5 moles/L relative to the nonaqueous solvent. Also, the mixing amount of the imide salt is more preferably 0.01 moles/L or more and not more than 0.3 moles/L, still more preferably 0.01 moles/L or more and not more than 0.1 moles/L, and especially preferably 0.01 moles/L or more and not more than 0.09 moles/L. When the addition amount of the imide salt according to the first embodiment is too small, the sufficient effect for forming a film is not obtainable. On the other hand, what the addition amount of the imide salt according to the first embodiment is too large is not preferable because an excessive film is formed.

Other Electrolyte Salt

As the lithium salt which is used together with the imide salt, an electrolyte salt which is generally used for nonaqueous electrolyte batteries can be used. Examples thereof include lithium hexafluorophosphate (LiPF$_6$), lithium tetrafluoroborate (LiBF$_4$), lithium perchlorate (LiClO$_4$), lithium hexafluoroarsenate (LiAsF$_6$), lithium tetraphenylborate (LiB(C$_6$H$_5$)$_4$), lithium methanesulfonate (LiCH$_3$SO$_3$), lithium trifluoromethanesulfonate (LiCF$_3$SO$_3$), lithium tetrachloroaluminate (LiAlCl$_4$), dilithium hexafluorosilicate (Li$_2$SiF$_6$), lithium chloride (LiCl) and lithium bromide (LiBr).

Above all, at least one member selected from the group consisting of lithium hexafluorophosphate (LiPF$_6$), lithium tetrafluoroborate (LiBF$_4$), lithium perchlorate (LiClO$_4$) and lithium hexafluoroarsenate (LiAsF$_6$) is preferable, and lithium hexafluorophosphate (LiPF$_6$) is more preferable. This is because the resistance of the electrolytic solution is lowered. It is especially preferable to use lithium tetrafluoroborate (LiBF$_4$) together with lithium hexafluorophosphate (LiPF$_6$). This is because high effects are obtainable.

Also, it is preferable that this electrolyte salt contains at least one member selected from the group consisting of compounds represented by the following formulae (9) to (11) in addition to the foregoing lithium salt. This is because when used together with the foregoing lithium hexafluorophosphate (LiPF$_6$) or the like, higher effects are obtainable. In the formula (9), each R21 may be the same as or different from every other R21. This matter is also applicable to R31 to R33 in the formula (10) and to R41 and R42 in the formula (11).

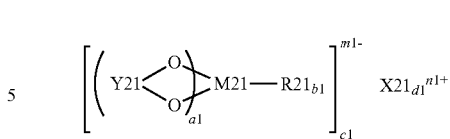

(9)

(In the formula (9), X21 represents a group 1 or 2 element in the long form of the periodic table or aluminum; M21 represents a transition metal element or a group 13, 14 or 15 element in the long form of the periodic table; R21 represents a halogen group; Y21 represents —OC—R22-CO—, —OC—C(R23)$_2$- or —OC—CO—, wherein R22 represents an alkylene group, a halogenated alkylene group, an arylene group or a halogenated arylene group, and R23 represents an alkyl group, a halogenated alkyl group, an aryl group or a halogenated aryl group; a1 represents an integer of from 1 to 4; b1 is 0, 2 or 4; and each of c1, d1, m1 and n1 represents an integer of from 1 to 3.)

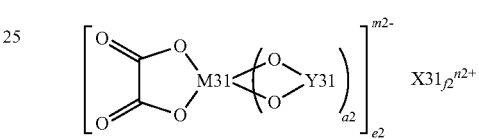

(10)

(In the formula (10), X31 represents a group 1 or 2 element in the long form of the periodic table; M31 represents a transition metal element or a group 13, 14 or 15 element in the long form of the periodic table; Y31 represents —OC—(C(R31)$_2$)$_{b2}$-CO—, —(R33)$_2$C—(C(R32)$_2$)$_{c2}$-CO—, —(R33)$_2$C—(C(R32)$_2$)$_{c2}$-C(R33)$_2$-, —(R33)$_2$C—(C(R32)$_2$)$_{c2}$-SO$_2$—, —O$_2$S—(C(R32)$_2$)$_{d2}$-SO$_2$— or —OC—(C(R32)$_2$)$_{d2}$-SO$_2$—, wherein each of R31 and R33 represents a hydrogen group, an alkyl group, a halogen group or a halogenated alkyl group, provided that at least of R31 and R33 represents a halogen group or a halogenated alkyl group, and R32 represents a hydrogen group, an alkyl group, a halogen group or a halogenated alkyl group; each of a2, e2 and n2 is 1 or 2; each of b2 and d2 represents an integer of from 1 to 4; c2 represents an integer of from 0 to 4; and each of f2 and m2 represents an integer of from 1 to 3.)

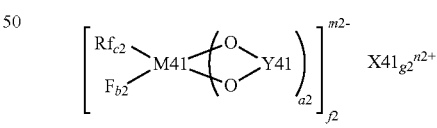

(11)

(In the formula (11), X41 represents a group 1 or 2 element in the long form of the periodic table; M41 represents a transition metal element or a group 13, 14 or 15 element in the long form of the periodic table; Rf represents a fluorinated alkyl group or a fluorinated aryl group each having from 1 to 10 carbon atoms; Y41 represents —OC—(C(R41)$_2$)$_{d3}$-CO—, —(R42)$_2$C—(C(R41)$_2$)$_{d3}$-CO—, —(R42)$_2$C—(C(R41)$_2$)$_{d3}$-C(R42)$_2$-, —(R42)$_2$C—(C(R41)$_2$)$_{d3}$-SO$_2$—, —O$_2$S—(C(R41)$_2$)$_{e3}$-SO$_2$— or —OC—(C(R41)$_2$)$_{e3}$-SO$_2$—, wherein R41 represents a hydrogen group, an alkyl group, a halogen group or a halogenated alkyl group, and R42 represents a hydrogen group, an alkyl group, a halogen group or a halogenated alkyl group, provided that at least one of R41 and R42 represents a halogen group or a halogenated alkyl group; each of a3, f3 and n3 is 1 or 2; each of b3, c3 and e3 represents an integer of from 1 to 4; d3 represents an integer of from 0 to 4; and each of g3 and m3 represents an integer of from 1 to 3.)

The group 1 element in the long form of the periodic table as referred to herein means hydrogen, lithium, sodium, potassium, rubidium, cesium or francium. The group 2 element as referred to herein means beryllium, magnesium, calcium, strontium, barium or radium. The group 13 element as referred to herein means boron, aluminum, gallium, indium or thallium. The group 14 element as referred to herein means carbon, silicon, germanium, tin or lead. The group 15 element as referred to herein means nitrogen, phosphorus, arsenic, antimony or bismuth.

As the compound represented by the formula (9), for example, compounds represented by the following formulae (9-1) to (9-6) and so on are exemplified. As the compound represented by the formula (10), for example, compounds represented by the following formulae (10-1) to (10-8) and so on are exemplified. As the compound represented by the formula (11), for example, a compound represented by the following formula (11-1) and so on are exemplified. Of these, lithium bisoxalate borate of the formula (9-6) is preferable. Needless to say, the compound is not limited to those represented by the formulae (9-1) to (9-6), (10-1) to (10-8) and (11-1) so far as it is a compound having any one of the structures represented by the formulae (9) to (11).

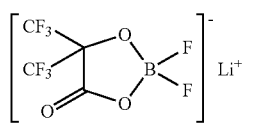
(9-1)

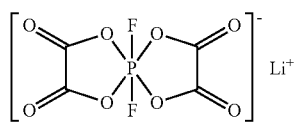
(9-2)

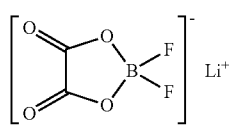
(9-3)

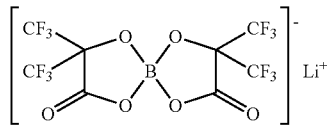
(9-4)

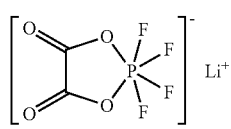
(9-5)

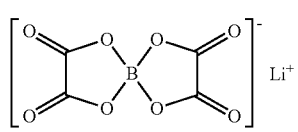
(9-6)

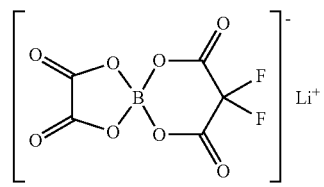
(10-1)

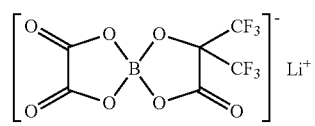
(10-2)

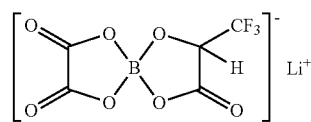
(10-3)

(10-4)

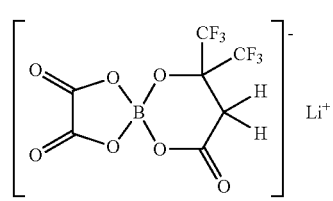
(10-5)

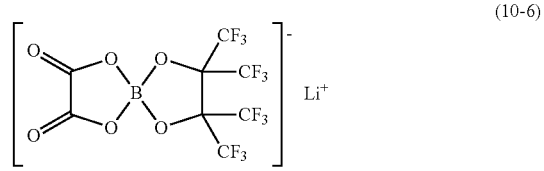
(10-6)

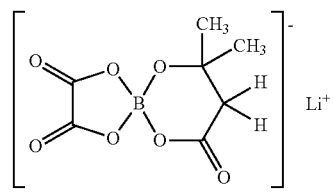
(10-7)

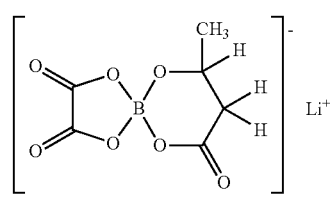
(10-8)

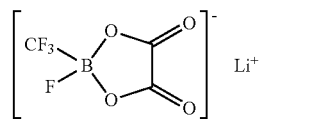
(11)

A content of the electrolyte salt other that the imide salt according to the first embodiment is preferably 0.3 moles/L or more and not more than 3.0 moles/L relative to the nonaqueous solvent. This is because when the content of the electrolyte salt other than the imide salt falls outside the foregoing range, there is a possible that the ion conductivity is extremely lowered.

According to this electrolytic solution, when the electrolytic solution contains the halogen element-containing carbonate represented by the formulae (1) and/or (2) as the nonaqueous solvent and the imide salt represented by the formula (3), especially one represented by the formula (4) or (5) as the electrolyte salt, the effect for forming a film on the electrode surface is enhanced, so that a firmer and more stable film can be formed. For that reason, the decomposition reaction of the electrolytic solution is suppressed, so that even when a charge/discharge cycle is advanced under a low temperature environment and a high temperature environment, the high battery capacity can be kept.

While the foregoing nonaqueous electrolyte has been described with respect to the nonaqueous electrolyte in a liquid form (electrolytic solution), the nonaqueous electrolyte may also be, for example, an electrolyte in a gel form.

2. Second Embodiment

In the second embodiment according to the present application, a cylinder type nonaqueous electrolyte battery is described.

(2-1) Configuration of Nonaqueous Electrolyte Battery

This nonaqueous electrolyte battery 20 is of a so-called cylinder type and has a wound electrode body 10 having a strip-shaped positive electrode 11 and a strip-shaped negative electrode 12 wound via a separator 13 in the inside of a substantially hollow columnar battery can 1.

Structure of Nonaqueous Electrolyte Battery

The separator 13 is impregnated with an electrolytic solution which is an electrolyte in a liquid form. The battery can 1 is, for example, constituted of nickel (Ni)-plated iron (Fe), and one end thereof is closed, with the other end being opened. In the inside of the battery can 1, a pair of insulating plates 2 and 3 is respectively disposed vertical to the winding peripheral face so as to interpose the wound electrode body 10 therebetween.

In the open end of the battery can 1, a battery lid 4 is installed by caulking with a safety valve mechanism 5 and a positive temperature coefficient device (PTC device) 6 provided in the inside of this battery lid 4 via a gasket 7. According to this, the inside of the battery can 1 is hermetically sealed.

The battery lid 4 is, for example, constituted of the same material as that in the battery can 1. The safety valve mechanism 5 is electrically connected to the battery lid 4 via the positive temperature coefficient device 6. This safety valve mechanism 5 has a function as a current shut-off valve such that when the internal pressure of the battery reaches a fixed value or more due to an internal short circuit or heating from the outside or the like, a disc plate 5A is reversed, thereby disconnecting electrical connection between the battery lid 4 and the wound electrode body 10.

When the temperature rises, the positive temperature coefficient device 6 controls the current by an increase of the resistance value, thereby preventing abnormal heat generation to be caused due to a large current. The gasket 7 is, for example, constituted of an insulating material, and asphalt is coated on the surface thereof.

For example, the wound electrode body 10 is wound on the center of a center pin 14. In the wound electrode body 10, a positive electrode lead 15 made of aluminum (Al) or the like is connected to the positive electrode 11; and a negative electrode lead 16 made of nickel (Ni) or the like is connected to the negative electrode 12. The positive electrode lead 15 is electrically connected to the battery lid 4 by means of welding to the safety valve mechanism 5; and the negative electrode lead 16 is electrically connected to the battery can 1 by means of welding.

Figure 2:
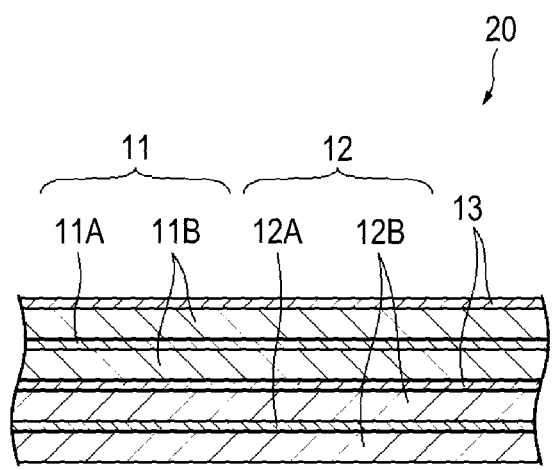
FIG. 2 is a sectional view showing a configuration of electrode lamination of a wound electrode body shown in FIG. 1.

FIG. 2 shows enlargedly a part of the wound electrode body 10 shown in FIG. 1. The wound electrode body 10 is one obtained by laminating the positive electrode 11 and the negative electrode 12 via the separator 13 and winding them.

Positive Electrode

The positive electrode 11 is one in which a positive electrode active material layer 11B containing a positive electrode active material is formed on the both surfaces of a positive electrode collector 11A. For the positive electrode collector 11A, for example, a metal foil such as an aluminum (Al) foil, a nickel (Ni) foil and a stainless steel (SUS) foil can be used.

The positive electrode active material layer 11B is, for example, constituted so as to contain a positive electrode active material, a conductive agent and a binder. As the positive electrode active material, a metal oxide, a metal sulfide or a specified polymer can be used depending upon the desired type of battery. For example, when a lithium ion battery is constituted, a complex oxide of lithium and a transition metal, which is composed mainly of $Li_xMO_2$ (in the formula, M represents at least one transition metal; and x varies depending upon the charge/discharge state and is in general 0.05 or more and not more than 1.10), is used. As the transition metal constituting the lithium complex oxide, cobalt (Co), nickel (Ni), manganese (Mn) and so on are useful.

Specific examples of such a lithium complex oxide include $LiCoO_2$, $LiNiO_2$, $LiMn_2O_4$ and $LiNi_yCO_{1-y}O_2$ (0<y<1). Also, a solid solution obtained by substituting a part of the transition metal elements with other element can be used. Examples thereof include $LiNi_{0.5}CO_{0.5}O_2$ and $LiNi_{0.8}CO_{0.2}O_2$. Such a lithium complex oxide is able to produce a high voltage and is excellent in the energy density.

Also, as the positive electrode active material, metal sulfides or oxides not containing lithium, such as $TiS_2$, $MoS_2$, $NbSe_2$ and $V_2O_5$, may be used. These positive electrode active materials may be used singly or in admixture of plural kinds thereof.

Examples of the conductive agent include carbon materials such as graphite, carbon black, acetylene black and ketjen black. These materials may be used singly or in admixture of plural kinds thereof. The conductive agent may be a metal material, a conductive polymer or the like so far as it is a material having conductivity.

Examples of the binder include synthetic rubbers such as a styrene butadiene based rubber, a fluorocarbon based rubber and ethylene propylene diene; and polymer materials such as polyvinylidene fluoride. These materials may be used singly or in admixture of plural kinds thereof.

The positive electrode 21 has the positive electrode lead 15 connected by spot welding or ultrasonic welding to one end portion of the positive electrode collector 11A. As the positive electrode lead 15, a metal foil or a network material is desirable. However, other material than a metal is also useful so far as it is stable electrochemically and chemically and has conductivity. Examples of a material of the positive electrode lead 15 include aluminum (Al) and nickel (Ni).

Negative Electrode

The negative electrode 12 is one in which a negative electrode active material layer 12B containing a negative electrode active material is formed on the both surfaces of a negative electrode collector 12A. For the negative electrode collector 12A, for example, a metal foil such as a copper (Cu) foil, a nickel foil and a stainless steel foil, can be used.

The negative electrode active material layer 12B is, for example, constituted so as to contain a negative electrode active material and optionally a conductive agent and a binder. As the negative electrode active material, a lithium metal, a lithium alloy, or a carbon material capable of doping and dedoping lithium or a complex material of a metallic material and a carbon based material is useful. Specific examples of the carbon material capable of doping and dedoping lithium include easily graphitized carbon, hardly graphitized carbon with a (002) plane interval of 0.37 nm or more and graphite with a (002) plane interval of not more than 0.34 nm. More specifically, there are exemplified pyrolytic carbons, cokes, vitreous carbon fibers, organic polymer compound baked materials, active carbon and carbon blacks. Of these, examples of the cokes include pitch coke, needle coke and petroleum coke. The organic polymer compound baked material as referred to herein is a material obtained through carbonization by baking a phenol resin, a furan resin or the like at an appropriate temperature. The carbon material is preferable because a change in a crystal structure following the intercalation and deintercalation of lithium is very small, and therefore, a high energy density is obtainable, excellent cycle characteristics are obtainable, and furthermore, the carbon material also functions as a conductive agent. The shape of the carbon material may be any of a fibrous shape, a spherical shape, a granular shape or a flaky shape.

Furthermore, as the material capable of doping and dedoping lithium, polymers such as polyacetylene and polypyrrole and oxides such as $SnO_2$ can be used.

In addition to the foregoing carbon materials, examples of the negative electrode material capable of intercalating and deintercalating lithium include a material capable of intercalating and deintercalating lithium and containing, as a constituent element, at least one member selected from the group consisting of metal elements and semi-metal elements. This is because a high energy density is obtainable. Such a negative electrode material may be a simple substance, alloy or compound of a metal element or a semi-metal element. Also, a material having one or two or more kinds of a phase in at least a part thereof may be used.

The "alloy" as referred to herein includes, in addition to those composed of two or more kinds of a metal element, those containing one or more kinds of a metal element and one or more kinds of a semi-metal element. Also, the "alloy" may contain a non-metal element. Examples of its texture include a solid solution, a eutectic (eutectic mixture), an intermetallic compound and one in which two or more kinds thereof coexist.

Examples of the metal element or semi-metal element include a lithium metal. Examples of a metal element or a semi-metal element capable of forming an alloy together with lithium include magnesium (Mg), boron (B), aluminum, gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd) and platinum (Pt).

As the negative electrode material constituted of a metal element or a semi-metal element capable of forming an alloy together with lithium, materials containing, as a constituent element, at least one member selected from the group consisting of group 14 metal elements and semi-metal elements in the long form of the periodic table are preferable, and materials containing, as a constituent element, at least one member selected from the group consisting of silicon (Si) and tin (Sn) are especially preferable. This is because such a material has large capability of intercalating and deintercalating lithium, so that a high energy density is obtainable.

Examples of the negative electrode material containing at least one member selected from the group consisting of silicon and tin include silicon, an alloy of silicon, a compound of silicon, tin, an alloy of tin, and a compound of tin; and a material having one or two or more kinds of a phase in at least a part thereof.

Examples of alloys of silicon include alloys containing, as a second constituent element other than silicon, at least one member selected from the group consisting of tin, nickel, copper, iron, cobalt, manganese, zinc, indium, silver, titanium, germanium, bismuth, antimony (Sb) and chromium. Examples of compounds of silicon include compounds containing oxygen or carbon (C), and these compounds may contain the foregoing second constituent element in addition to silicon.

Examples of alloys or compounds of silicon include $SiB_2$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$) and $LiSiO$.

Examples of alloys of tin include alloys containing, as a second constituent element other than tin, at least one member selected from the group consisting of silicon, nickel, copper, iron, cobalt, manganese, zinc, indium, silver, titanium, germanium, bismuth, antimony and chromium. Examples of compounds of tin include compounds containing oxygen or carbon, and these compounds may contain the foregoing second constituent element in addition to tin. Examples of alloys or compounds of tin include $SnO_w$ ($0<w\leq2$), $SnSiO_3$, $LiSnO$ and $Mg_2Sn$.

Separator

The separator 13 partitions the positive electrode 11 and the negative electrode 12 from each other and allows a lithium ion to pass therethrough while preventing a short circuit of the current to be caused due to the contact between the both electrodes. As the separator 13, any material is useful so far as it is electrochemically stable and chemically stable against the positive electrode active material, the negative electrode active material or the solvent and does not have electrical conductivity. Examples thereof include a nonwoven fabric of a polymer, a porous film and a material obtained by forming glass or ceramic fibers into a paper-like state, and a plurality of these materials may be laminated and used. In particular, it is preferable to use a porous polyolefin film, and this may be compounded with a heat-resistant material made of polyimide, glass or ceramic fibers and used. This separator 13 is impregnated with the foregoing electrolyte.

In this nonaqueous electrolyte battery, for example, when charged, a lithium ion is deintercalated from the positive electrode 11 and intercalated in the negative electrode 12 via the electrolytic solution impregnated in the separator 13. On the other hand, for example, when discharged, a lithium ion is deintercalated from the negative electrode 12 and intercalated in the positive electrode 11 via the electrolytic solution impregnated in the separator 13.

According to this nonaqueous electrolyte battery, in the case where a capacity of the negative electrode 12 is expressed on the basis of intercalation and deintercalation of lithium, since the nonaqueous electrolyte battery is provided with the electrolytic solution according to the foregoing first embodiment, the decomposition reaction of the electrolytic solution is suppressed at the time of charge/discharge. In consequence, in particular, the cycle characteristics and storage characteristics at the time of use at high temperatures can be enhanced.

(2-2) Manufacturing Method of Nonaqueous Electrolyte Battery

Next, a manufacturing method of the nonaqueous electrolyte battery is described.

Manufacturing Method of Positive Electrode

A positive electrode active material, a binder and a conductive agent are mixed to prepare a positive electrode mixture, and this positive electrode mixture is dispersed in a solvent such as N-methyl-2-pyrrolidone, thereby preparing a positive electrode mixture slurry. Subsequently, this positive electrode mixture slurry is coated on the positive electrode collector 11A and dried, and the resultant is then compression molded by a roll press or the like to form the positive electrode active material layer 11B. There is thus obtained the positive electrode 11.

Manufacturing Method of Negative Electrode

A negative electrode active material and a binder are mixed to prepare a negative electrode mixture, and this negative electrode mixture is dispersed in a solvent such as N-methyl-2-pyrrolidone, thereby preparing a negative electrode mixture slurry. Subsequently, this negative electrode mixture slurry is coated on the negative electrode collector 12A, and after drying the solvent, the resultant is compression molded by a roll press or the like to form the negative electrode active material layer 12B. There is thus obtained the negative electrode 12.

Manufacturing Method of Nonaqueous Electrolyte

In the nonaqueous solvent, a cyclic carbonate, a chain carbonate and a halogen element-containing carbonate including at least one of the formula (1) and the formula (2) are mixed in a prescribed volume ratio, and thereafter, the imide salt according to the first embodiment and an electrolyte salt are dissolved therein. At that time, the cyclic carbonate and the chain carbonate are mixed in a volume ratio preferably ranging from 1/99 to 55/45, and more preferably ranging from 15/85 to 45/55. It is preferable that the halogen element-containing carbonate is contained in an amount in the range of 0.1% by volume or more and not more than 50% by volume relative to the whole of the nonaqueous solvent.

It is preferable that the imide salt is mixed in an amount in the range of 0.001 moles/L or more and not more than 0.5 moles/L relative to the nonaqueous solvent. Also, the mixing amount is more preferably 0.01 moles/L or more and not more than 0.3 moles/L, still more preferably 0.01 moles/L or more and not more than 0.1 moles/L, and especially preferably 0.01 moles/L or more and not more than 0.09 moles/L.

Assembling of Cylinder Type Nonaqueous Electrolyte Battery

The positive electrode lead 15 is installed in the positive electrode collector 11A by means of welding or the like, and the negative electrode lead 16 is also installed in the negative electrode collector 12A by means of welding or the like. Thereafter, the positive electrode 11 and the negative electrode 12 are wound via the separator 13; a tip portion of the positive electrode lead 15 is welded to the safety valve mechanism 5; and a tip portion of the negative electrode lead 16 is also welded to the battery can 1.

Then, the wound positive electrode 11 and negative electrode 12 are interposed between a pair of the insulating plates 2 and 3 and housed in the inside of the battery can 1. After housing the positive electrode 11 and the negative electrode 12 in the inside of the battery can 1, a nonaqueous electrolyte is injected into the inside of the battery can 1, thereby impregnating it in the separator 13.

Thereafter, the battery lid 4 provided with the safety valve mechanism 5 and the positive temperature coefficient device 6 is fixed to the open end portion of the battery can 1 upon being caulked via the gasket 7. There is thus fabricated the nonaqueous electrolyte battery shown in FIG. 1.

According to the nonaqueous electrolyte battery using such a nonaqueous electrolyte, the effect for forming a film on the electrode surface is enhanced, so that a firmer and more stable film can be formed. For that reason, the decomposition reaction of the electrolytic solution is suppressed, so that even when a charge/discharge cycle is advanced under a low temperature environment and a high temperature environment, the high battery capacity can be kept. Also, since the decomposition of the electrolytic solution is suppressed, an operating time of the current shut-off valve can be prolonged.

3. Third Embodiment (3-1) Configuration of Nonaqueous Electrolyte Battery:

In a third embodiment according to the present application, a nonaqueous electrolyte battery which is packaged by a laminated film is described.

Figure 3:
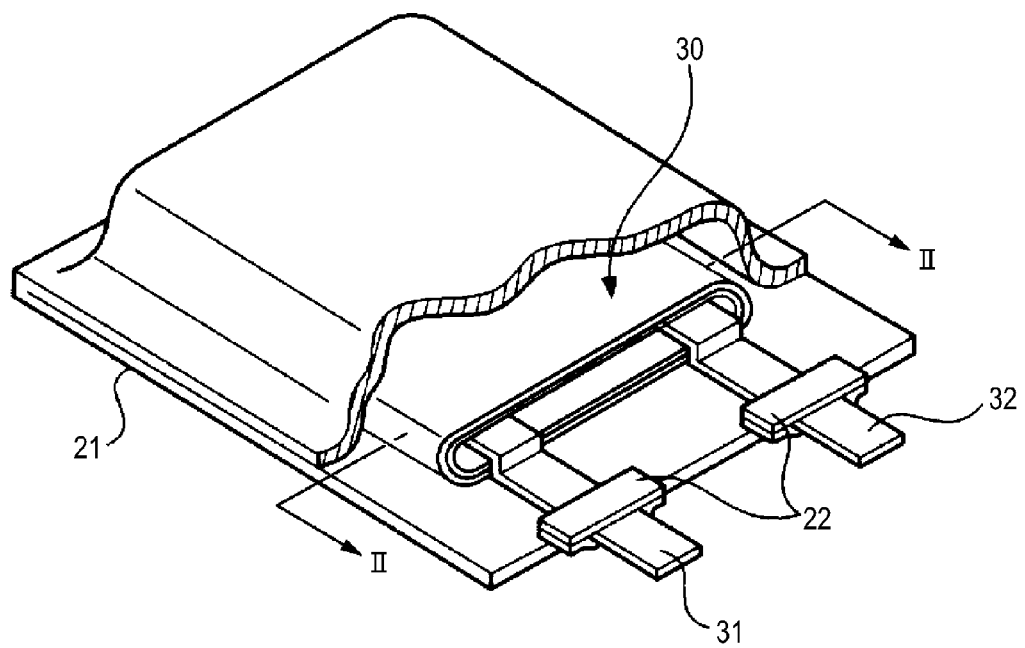
FIG. 3 is a schematic view showing a configuration example of a nonaqueous electrolyte battery according to a third embodiment.
Figure 4:
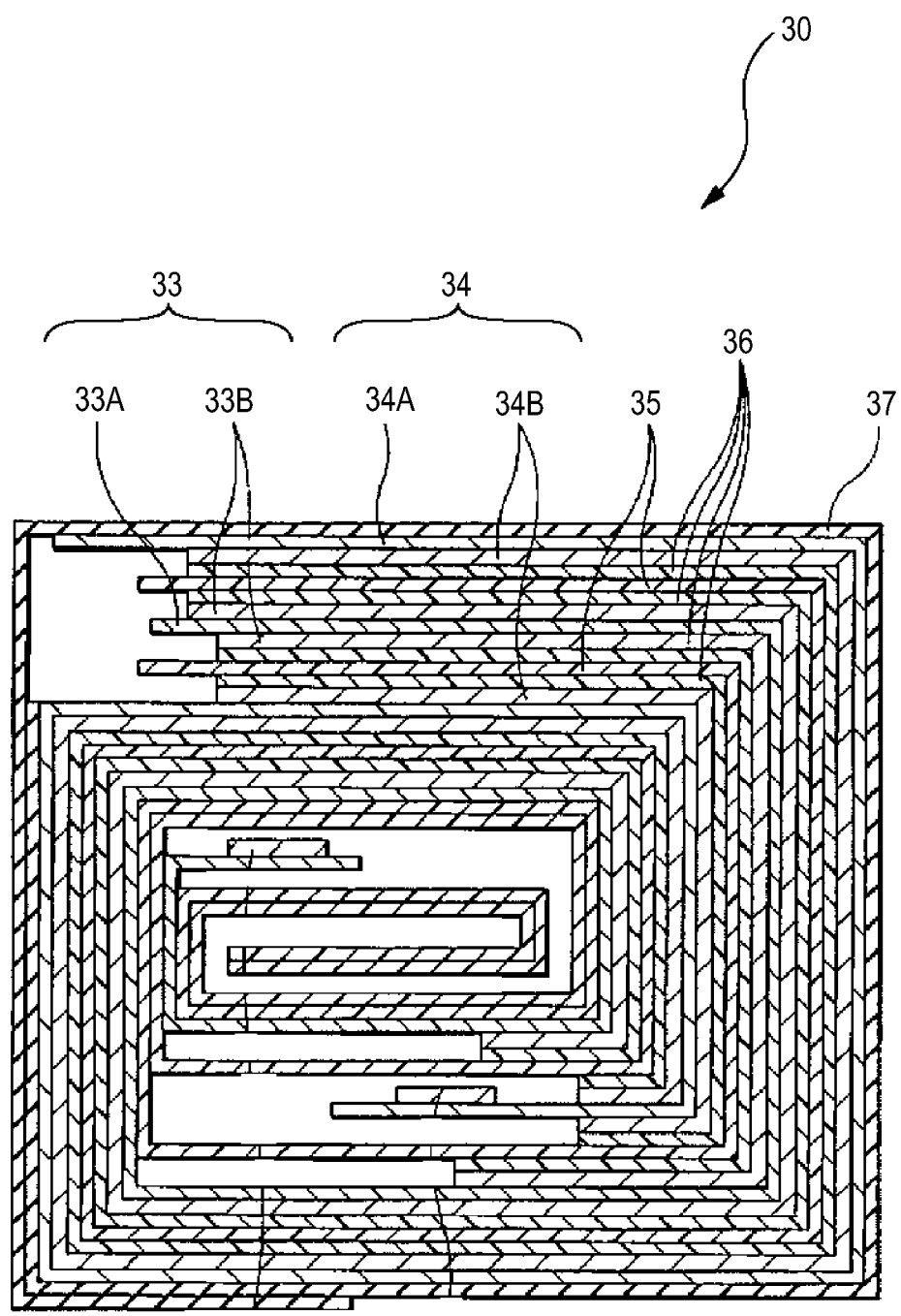
FIG. 4 is a sectional view along a II-II line of FIG. 3, which shows a configuration of electrode lamination of a wound electrode body shown in FIG. 3.

FIG. 3 is a schematic view showing a configuration example of a nonaqueous electrolyte battery according to the third embodiment. FIG. 4 shows a structure of electrode lamination of the nonaqueous electrolyte battery according to the third embodiment.

This nonaqueous electrolyte battery has a configuration in which a wound battery body 30 having a positive electrode lead 31 and a negative electrode lead 32 installed therein is housed in the inside of a film-shaped package member 21 and has a flat shape. Each of the positive electrode lead 31 and the negative electrode lead 32 is, for example, formed in a strip shape and led out from the inside of the package member 21 toward the outside in, for example, the same direction. The positive electrode lead 31 is, for example, constituted of a metal material such as aluminum (Al), and the negative electrode lead 32 is, for example, constituted of a metal material such as nickel (Ni).

Package Member

The package member 21 is a laminated film having a structure in which, for example, a heat-fusible layer, a metal layer and a package resin layer are laminated in this order and stuck by means of lamination processing or the like. In the package member 21, for example, the respective outer edges are allowed to closely adhere to each other by means of fusion or with an adhesive such that the side of the heat-fusible layer is faced inward.

The heat-fusible layer is, for example, constituted of a polyolefin resin such as polyethylene, polypropylene, modified polyethylene, modified polypropylene and a copolymer thereof. This is because the moisture permeability can be made low, and the air tightness is excellent. The metal layer is constituted of aluminum, stainless steel, nickel, iron or the like in a foil form or a plate form. The package resin layer may be, for example, constituted of the same resin as that in the heat-fusible layer, or may be constituted of nylon or the like. This is because the strength against breakage, piercing or the like can be enhanced. The package member 21 may be provided with other layer than the heat-fusible layer, the metal layer and the package resin layer.

A contact film 22 is inserted between the package member 21 and each of the positive electrode lead 31 and the negative electrode lead 32 for the purposes of enhancing adhesion between each of the positive electrode lead 31 and the negative electrode lead 32 and the inside of the package member 21 and preventing invasion of the outside air. The contact film 22 is constituted of a material having adhesion to each of the positive electrode lead 31 and the negative electrode lead 32. In the case where each of the positive electrode lead 31 and the negative electrode lead 32 is constituted of the foregoing metal material, it is preferable that the contact film 22 is constituted of a polyolefin resin such as polyethylene, polypropylene, modified polyethylene and modified polypropylene.

FIG. 4 is a sectional view along a II-II line of the wound electrode body 30 shown in FIG. 3. The wound electrode body 30 is one prepared by laminating a positive electrode 33 and a negative electrode 34 via a separator 35 and an electrolyte 36 and winding the laminate, and an outermost peripheral part thereof is protected by a protective tape 37.

Positive Electrode and Negative Electrode

For each of the positive electrode 33 and the negative electrode 34 in the third embodiment according to the present application, the same material and configuration as in each of the positive electrode 11 and the negative electrode 12 in the second embodiment can be used.

Nonaqueous Electrolyte

As the nonaqueous electrolyte, the same nonaqueous electrolyte as in the second embodiment according to the present application can be used. Also, a nonaqueous electrolyte in a gel form (hereinafter properly referred to as "gel electrolyte") may be used. The electrolyte in a gel form is preferable because not only a high ion conductivity (for example, 1 mS/cm or more at room temperature) is obtainable, but the liquid leakage is prevented. The gel electrolyte is hereunder described.

The gel electrolyte contains a nonaqueous solvent, an electrolyte salt and a matrix polymer which will become gelled upon taking the nonaqueous solvent thereinto. For each of the nonaqueous solvent and the electrolyte salt, the same material as in the first embodiment according to the present application can be used.

Examples of the matrix polymer include polyacrylonitrile, polyvinylidene fluoride, a copolymer of polyvinylidene fluoride and polyhexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, a styrene-butadiene rubber, a nitrile-butadiene rubber, polystyrene and polycarbonate. These materials may be used singly or in admixture of plural kinds thereof.

In particular, from the standpoint of electrochemical stability, it is preferable to use polyacrylonitrile, polyvinylidene fluoride, polyhexafluoropropylene, polyethylene oxide or the like. Though an addition amount of the polymer compound in the electrolytic solution varies depending upon the compatibility therebetween, it is preferably 5% by mass or more and not more than 50% by mass.

Though the composition of the nonaqueous electrolytic solution to be contained in the gel electrolyte is the same as the composition of the nonaqueous electrolytic solution in the first embodiment according to the present application, the nonaqueous solvent as referred to herein means a broad concept including not only a liquid solvent but a solvent with ion conductivity capable of dissociating an electrolyte salt. In consequence, when a polymer compound with ion conductivity is used, the subject polymer compound is also included in the solvent.

Separator

For the separator 35 in the third embodiment according to the present application, the same material and configuration as in the separator 13 in the second embodiment according to the present application can be used.

(3-2) Manufacturing Method of Nonaqueous Electrolyte Battery:

Fabrication of Positive Electrode and Negative Electrode

For a manufacturing method of each of the positive electrode 33 and the negative electrode 34 in the third embodiment according to the present application, the same manufacturing method of each of the positive electrode 11 and the negative electrode 12 in the second embodiment according to the present application can be adopted.

Assembling Method of Nonaqueous Electrolyte Battery

An electrolyte precursor solution containing a nonaqueous solvent containing a halogen element-containing carbonate, an electrolyte salt containing the imide salt according to the first embodiment, a polymer compound, a matrix polymer and a solvent is coated on each of the positive electrode 33 and the negative electrode 34, and the solvent is evaporated off, thereby forming a gel electrolyte layer.

Subsequently, for each of the positive electrode 33 and the negative electrode 34, the positive electrode lead 31 is installed in an end potion of the positive electrode collector 33A by welding, and the negative electrode lead 32 is also installed in an end portion of the negative electrode collector 34A by welding. Subsequently, the positive electrode 33 and the negative electrode 34 are laminated via the separator 35, the laminate is then wound in a longitudinal direction thereof, and the protective tape 37 is allowed to adhere to an outermost peripheral part thereof, thereby fabricating the wound electrode body 30. Finally, for example, the wound electrode body 30 is interposed into the package member 21, and the outer edges of the package member 21 are allowed to adhere to each other by means of heat fusion, etc., thereby sealing the wound electrode body 30 therein. On that occasion, the contact film 22 is inserted between each of the positive electrode lead 31 and the negative electrode lead 32 and the package member 21. There is thus completed the nonaqueous electrolyte battery shown in FIGS. 3 and 4.

According to the nonaqueous electrolyte battery using such a nonaqueous electrolyte according to the third embodiment, the effect for forming a film on the electrode surface is enhanced, so that a firmer and more stable film can be formed. For that reason, the decomposition reaction of the electrolytic solution is suppressed, so that even when a charge/discharge cycle is advanced under a low temperature environment and a high temperature environment, the high battery capacity can be kept. Also, since the decomposition of the electrolytic solution is suppressed, an increase of the thickness of the battery to be caused due to the generation of a gas can be suppressed.

4. Fourth Embodiment

In a fourth embodiment according to the present application, a coin type nonaqueous electrolyte battery is described.

(4-1) Configuration of Coin Type Nonaqueous Electrolyte Battery

Figure 5:
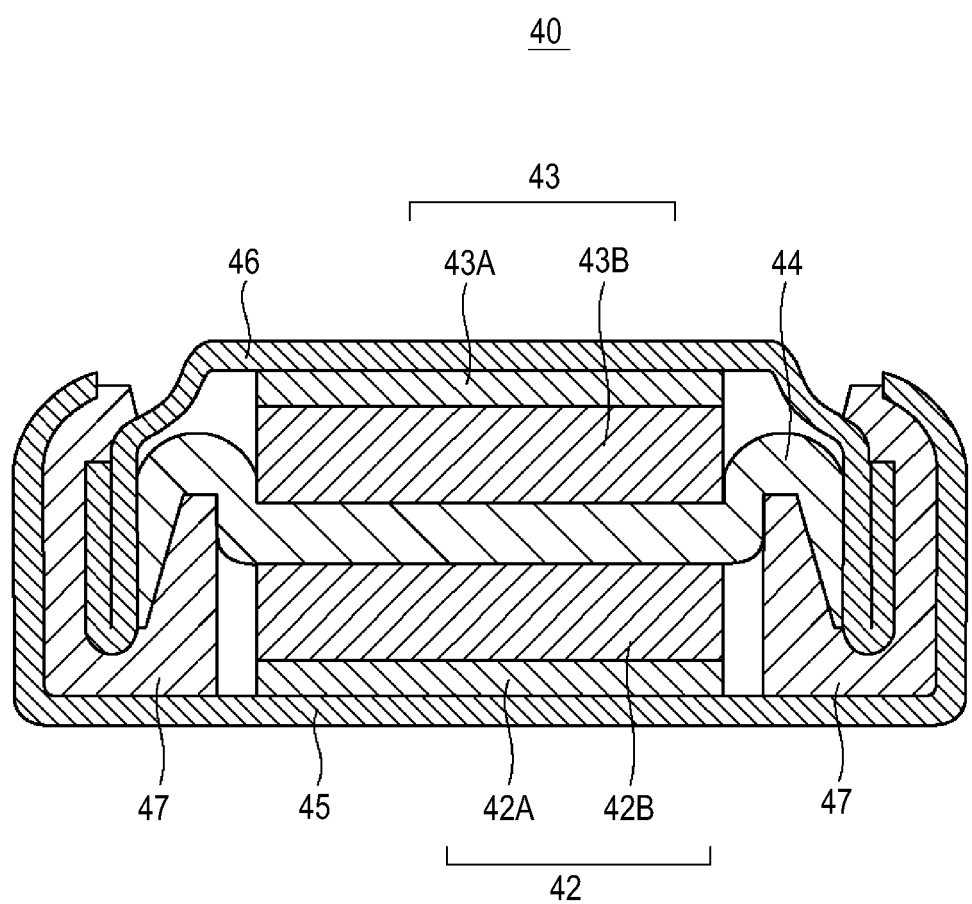
FIG. 5 is a sectional view showing a configuration example of a nonaqueous electrolyte battery according to a fourth embodiment.

FIG. 5 shows a sectional view of a configuration of a coin type nonaqueous electrolyte battery in a fourth embodiment according to the present application. This nonaqueous electrolyte battery is of a so-called coin type and is one in which a disc-shaped positive electrode 42 housed in a positive electrode can 45 and a disc-shaped negative electrode 43 housed in a negative electrode can 46 are laminated via a separator 44. The separator 44 is impregnated with a nonaqueous electrolytic solution which is an electrolyte in a liquid form, and the respective outer edges of the positive electrode can 45 and the negative electrode can 46 are hermetically sealed upon being caulked via a gasket 47. The gasket 47 is one for preventing the liquid leakage of the nonaqueous electrolytic solution filled in each of the positive electrode can 45 and the negative electrode can 46 and is inserted into and integrated with the negative electrode can 46. Also, in the case where a solid electrolyte or a gel electrolyte is used together with or in place of the nonaqueous electrolytic solution, a solid electrolytic layer or a gel electrolyte layer is formed on each of the positive electrode 42 and the negative electrode 43.

Package Can

Each of the positive electrode can 45 and the negative electrode can 46 is, for example, constituted of a metal such as stainless steel and aluminum (Al). The positive electrode can 45 is one for housing the positive electrode 42 therein and also functions as an external terminal on the positive electrode side of the nonaqueous electrolyte battery 40. The negative electrode can 46 is one for housing the negative electrode 43 therein and also functions as an external terminal on the negative electrode side of the nonaqueous electrolyte battery 40.

Positive Electrode and Negative Electrode

For each of the positive electrode 42 and the negative electrode 43 in the fourth embodiment according to the present application, the same material as in each of the positive electrode 11 and the negative electrode 12 in the second embodiment can be used.

The positive electrode 42 in the fourth embodiment according to the present application has a shape punched out in a pellet form, in which a positive electrode active material layer 42B is formed on one of the surfaces of a positive electrode collector 42A. The negative electrode 43 is similarly punched out in a pellet form.

Nonaqueous Electrolyte

For the nonaqueous electrolyte, the same material as that in the second embodiment according to the present application can be used.

Separator

For the separator 44 in the fourth embodiment according to the present application, the same material and configuration as in the separator 13 in the second embodiment according to the present application can be used.

(4-2) Manufacturing Method of Nonaqueous Electrolyte Battery

Fabrication of Positive Electrode and Negative Electrode

Similar to the second embodiment according to the present application, a positive electrode active material and a binder are mixed to prepare a positive electrode mixture, and this positive electrode mixture is dispersed in a solvent such as N-methyl-2-pyrrolidone, thereby preparing a positive electrode mixture slurry. The positive electrode mixture slurry is coated on the positive electrode collector 42A, and after drying the solvent, the resultant is compression molded by a roll press or the like to form the positive electrode active material layer 42B, followed by punching out in a pellet form. There is thus obtained the positive electrode 42.

Similar to the above, with respect to the negative electrode 43, a negative electrode active material and a binder are mixed to prepare a negative electrode mixture, and this negative electrode mixture is dispersed in a solvent such as N-methyl-2-pyrrolidone, thereby preparing a negative electrode mixture slurry. Subsequently, the negative electrode mixture slurry is coated on a negative electrode collector 43A, and after drying the solvent, the resultant is compression molded by a roll press or the like to form a negative electrode active material layer 43B, followed by punching out in a pellet form. There is thus obtained the negative electrode 43.

Assembling of Nonaqueous Electrolyte Battery

Subsequently, the negative electrode 43 and the separator 44 are housed in this order in the center of the negative electrode can 46, and an electrolytic solution is injected from the top of the separator 44. Subsequently, the positive electrode can 45 having the positive electrode 42 housed therein is covered on the negative electrode can 46 and caulked via the gasket 47, thereby fixing the positive electrode can 45 and the negative electrode can 46 to each other. There is thus formed the nonaqueous electrolyte battery 40 shown in FIG. 5.

According to the nonaqueous electrolyte battery using such a nonaqueous electrolyte according to the fourth embodiment, the effect for forming a film on the electrode surface is enhanced, so that a firmer and more stable film can be formed. For that reason, the decomposition reaction of the electrolytic solution is suppressed, so that even when a charge/discharge cycle is advanced under a low temperature environment and a high temperature environment, the high battery capacity can be kept. Also, since the decomposition of the electrolytic solution is suppressed, the generation of a gas can be suppressed.

EXAMPLES

In the following respective Examples, the battery characteristics by the addition of the imide salt according to the first embodiment were evaluated. In the following respective Examples, lithium bis(fluorosulfonyl)imide (LiN(FSO$_2$)$_2$: LiFSI) represented by the following formula (4) and lithium (fluorosulfonyl)(trifluoromethylsulfonyl)imide (LiN(FSO$_2$)(CF$_3$SO$_2$)) represented by the following formula (5) were used as the imide salt according to the first embodiment.

(4)

(5)

Also, lithium bis(trifluoromethanesulfonyl)imide (LiTFSI) represented by the following formula (12) and ethanedisulfonyl difluoride represented by the following formula (13) were used as other imide salt.

(12)

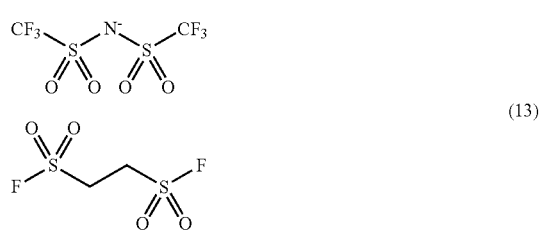

(13)

Example 1

In Example 1, nonaqueous electrolyte batteries were fabricated by changing a composition of a nonaqueous solvent of an electrolytic solution and a mixing amount of an electrolyte salt, and battery characteristics thereof were evaluated.

Example 1-1

Fabrication of Positive Electrode

Lithium carbonate ($Li_2CO_3$) and cobalt carbonate ($CoCO_3$) were mixed in a molar ratio of 0.5/1 and then baked in air at 900° C. for 5 hours to obtain a lithium cobalt complex oxide ($LiCoO_2$). Subsequently, 91 parts by mass of the lithium cobalt complex oxide as a positive electrode active material, 6 parts by mass of graphite as a conductive agent and 3 parts by mass of polyvinylidene fluoride as a binder to prepare a positive electrode mixture. This positive electrode mixture was dispersed in N-methyl-2-pyrrolidone to prepare a positive electrode mixture slurry in a paste form. Then, the positive electrode mixture slurry was coated on the both surfaces of a positive electrode collector made of a strip-shaped aluminum foil (12 μm in thickness), and after drying, the resultant was compression molded by a roll press to form a positive electrode active material layer. Thereafter, an aluminum-made positive electrode lead was installed in one end of the positive electrode collector by means of welding.

Fabrication of Negative Electrode 97 parts by mass of an artificial graphite powder as a negative electrode active material and 3 parts by mass of polyvinylidene fluoride as a binder were mixed to prepare a negative electrode mixture. This negative electrode mixture was dispersed in N-methyl-2-pyrrolidone to prepare a negative electrode mixture slurry in a paste form. Then, the negative electrode mixture slurry was coated on the both surfaces of a negative electrode collector made of a strip-shaped copper foil (15 μm in thickness), and after drying, the resultant was compression molded by a roll press to form a negative electrode active material layer. Thereafter, a nickel-made negative electrode lead was installed in one end of the negative electrode collector by means of welding.

Preparation of Nonaqueous Electrolytic Solution

A mixture of ethylene carbonate (EC), dimethyl carbonate (DMC) and 4-fluoro-1,3-dioxolan-2-one (FEC) in a proportion of 24.9/75/0.1 in terms of a volume ratio was used as a nonaqueous solvent. Also, 0.001 moles/L of lithium bis(fluorosulfonyl)imide (LiFSI) represented by the formula (4) and 1.099 moles/L of lithium hexafluorophosphate (LiPF6) were used as an electrolyte salt and dissolved in the nonaqueous solvent to prepare a nonaqueous electrolytic solution.

Assembling of Nonaqueous Electrolyte Battery

The positive electrode and the negative electrode were laminated via a separator made of a microporous polypropylene film (25 μm in thickness) and spirally wound many times, and an end of winding was fixed by an adhesive tape to form a wound electrode body. Subsequently, a nickel-plated iron-made battery can was prepared; a wound surface of the wound electrode body was interposed between a pair of insulating plates; and the negative electrode lead was welded to the battery can, and also, the positive electrode lead was welded to a safety valve mechanism connected to a battery lid. Subsequently, the wound electrode body was housed in the inside of the battery can, and the electrolytic solution was injected into the inside of the battery can in a pressure reduction mode.

Subsequently, the battery lid was caulked with the battery can via a gasket having asphalt coated on the surface thereof, thereby fixing the safety valve mechanism, a positive temperature coefficient device and the battery lid. In this way, the air tightness in the inside of the battery can was ensured, and a cylinder type nonaqueous electrolyte battery was completed.

Examples 1-2 to 1-48

A nonaqueous electrolyte battery of each of Examples 1-2 to 1-48 was fabricated by changing a composition of a nonaqueous solvent and an addition amount of an electrolyte salt. The composition of the nonaqueous solvent and the addition amount of the electrolyte salt of each of the Examples and Comparative Examples are shown in the following Tables 1 and 2.

Comparative Example 1-1

4-Fluoro-1,3-dioxolan-2-one (FEC) which is a halogenated carbonate and lithium bis(fluorosulfonyl)imide (LiFSI) were not added. As other composition, one shown in Table 3 was used, thereby fabricating a nonaqueous electrolyte battery.

Comparative Example 1-2

4-Fluoro-1,3-dioxolan-2-one (FEC) was not added, and the mixing amount of lithium bis(fluorosulfonyl)imide (LiFSI) was set up at 0.05 moles/L. As other composition, one shown in Table 3 was used, thereby fabricating a nonaqueous electrolyte battery.

Comparative Example 1-3

Lithium bis(fluorosulfonyl)imide (LiFSI) was not added, and the mixing amount of 4-fluoro-1,3-dioxolan-2-one (FEC) was set up at 5% by volume. As other composition, one shown in Table 3 was used, thereby fabricating a nonaqueous electrolyte battery.

Comparative Example 1-4

As the electrolyte salt, $LiPF_6$ was not added. As other composition, one shown in Table 3 was used, thereby fabricating a nonaqueous electrolyte battery.

Comparative Example 1-5

As the nonaqueous solvent, ethylene carbonate was not added. As other composition, one shown in Table 3 was used, thereby fabricating a nonaqueous electrolyte battery.

Comparative Example 1-6

LiFSI was not added, and lithium bis(trifluoromethanesulfonyl)imide (LiTFSI) represented by the formula (12) as other imide salt was added in a concentration of 0.05 moles/L. As other composition, one shown in Table 3 was used, thereby fabricating a nonaqueous electrolyte battery.

Comparative Example 1-7

LiFSI was not added, and ethanedisulfonyl difluoride represented by the formula (13) was added in a concentration of 0.05 moles/L. As other composition, one shown in Table 3 was used, thereby fabricating a nonaqueous electrolyte battery.

Comparative Example 1-8

As the nonaqueous solvent, vinylene carbonate (VC) was mixed in place of FEC which is a halogenated carbonate. As other composition, one shown in Table 3 was used, thereby fabricating a nonaqueous electrolyte battery.

Evaluation of Battery (a) Measurement of Shut-Off Time:

The nonaqueous electrolyte battery of each of the foregoing Examples and Comparative Examples was charged in a constant current density of 1 mA/cm² under an environment at 23° C. until the battery voltage reached 4.2 V and then charged at a constant voltage of 4.2 V until the current density reached 0.02 mA/cm². Thereafter, the fully charged nonaqueous electrolyte battery was stored at 80° C., and a time until the battery was shut off was determined.

(b) Low Temperature Cycle Characteristics

The nonaqueous electrolyte battery was charged in a constant current density of 1 mA/cm² under an environment at 23° C. until the battery voltage reached 4.2 V and then charged at a constant voltage of 4.2 V until the current density reached 0.02 mA/cm². Subsequently, the battery was discharged in a constant current density of 1 mA/cm² until the battery voltage reached 3.0 V, thereby carrying out charge/discharge at a first cycle. Subsequently, charge/discharge at a second cycle was carried out under an environment at −25° C. under the foregoing current density condition, and at this point of time, a discharge capacity (discharge capacity at the second cycle) was confirmed.

Furthermore, charge/discharge of from a third cycle to a 50th cycle was carried out under an environment at −25° C., and at this point of time, a discharge capacity (discharge capacity at the 50th cycle) was confirmed. A capacity retention rate of the discharge capacity under a low temperature environment was calculated according to the following expression.

Capacity retention rate[%]={(Discharge capacity at the 50th cycle)/(Discharge capacity at the second cycle)}×100

(c) High temperature cycle characteristics

The nonaqueous electrolyte battery was charged in a constant current density of 1 mA/cm² under an environment at 23° C. until the battery voltage reached 4.2 V and then charged at a constant voltage of 4.2 V until the current density reached 0.02 mA/cm². Subsequently, the battery was discharged in a constant current density of 1 mA/cm² until the battery voltage reached 3.0 V, thereby carrying out charge/discharge at a first cycle. Subsequently, charge/discharge at a second cycle was carried out under an environment at 65° C. under the foregoing current density condition, and at this point of time, a discharge capacity (discharge capacity at the second cycle) was confirmed.

Furthermore, charge/discharge of from a third cycle to a 100th cycle was carried out under an environment at 65° C., and at this point of time, a discharge capacity (discharge capacity at the 100th cycle) was confirmed. A capacity retention rate of the discharge capacity under a high temperature environment was calculated according to the following expression.

Capacity retention rate[%]={(Discharge capacity at the 100th cycle)/(Discharge capacity at the second cycle)}×100

Configurations of the respective Examples and Comparative Examples are shown in Tables 1 to 3. Also, measurement results are shown in Tables 1 to 3.

TABLE 1

| | Ethylene carbonate Mixing amount [% by volume] | Dimethyl carbonate Mixing amount [% by volume] | Halogenated carbonate Material | Halogenated carbonate Mixing amount [% by volume] | Mixing amount of LiFSI [mole/L] | Mixing amount of LiPF6 [mole/L] | Other additive | Operating time of current shut-off valve [h] | Discharge capacity retention rate [%] Low temperature cycle | Discharge capacity retention rate [%] High temperature cycle |
|---|---|---|---|---|---|---|---|---|---|---|
| Example 1-1 | 24.9 | 75 | FEC | 0.1 | 0.001 | 1.099 | — | 513 | 53 | 77 |
| Example 1-2 | 24.9 | 75 | FEC | 0.1 | 0.01 | 1.09 | — | 810 | 71 | 83 |
| Example 1-3 | 24.9 | 75 | FEC | 0.1 | 0.02 | 1.08 | — | 823 | 71 | 84 |
| Example 1-4 | 24.9 | 75 | FEC | 0.1 | 0.05 | 1.05 | — | 819 | 72 | 85 |
| Example 1-5 | 24.9 | 75 | FEC | 0.1 | 0.09 | 1.01 | — | 805 | 72 | 86 |
| Example 1-6 | 24.9 | 75 | FEC | 0.1 | 0.1 | 1.1 | — | 677 | 70 | 85 |
| Example 1-7 | 24.9 | 75 | FEC | 0.1 | 0.3 | 0.8 | — | 550 | 68 | 81 |
| Example 1-8 | 24.9 | 75 | FEC | 0.1 | 0.5 | 0.6 | — | 502 | 54 | 78 |
| Example 1-9 | 24 | 75 | FEC | 1 | 0.001 | 1.099 | — | 518 | 54 | 78 |
| Example 1-10 | 24 | 75 | FEC | 1 | 0.01 | 1.09 | — | 815 | 75 | 85 |
| Example 1-11 | 24 | 75 | FEC | 1 | 0.02 | 1.08 | — | 829 | 78 | 86 |
| Example 1-12 | 24 | 75 | FEC | 1 | 0.05 | 1.05 | — | 824 | 81 | 87 |
| Example 1-13 | 24 | 75 | FEC | 1 | 0.09 | 1.01 | — | 811 | 82 | 87 |
| Example 1-14 | 24 | 75 | FEC | 1 | 0.1 | 1.1 | — | 678 | 79 | 86 |
| Example 1-15 | 24 | 75 | FEC | 1 | 0.3 | 0.8 | — | 552 | 72 | 82 |
| Example 1-16 | 24 | 75 | FEC | 1 | 0.5 | 0.6 | — | 503 | 54 | 78 |
| Example 1-17 | 20 | 75 | FEC | 5 | 0.001 | 1.099 | — | 520 | 55 | 78 |
| Example 1-18 | 20 | 75 | FEC | 5 | 0.01 | 1.09 | — | 817 | 77 | 86 |
| Example 1-19 | 20 | 75 | FEC | 5 | 0.02 | 1.08 | — | 833 | 80 | 86 |
| Example 1-20 | 20 | 75 | FEC | 5 | 0.05 | 1.05 | — | 827 | 81 | 87 |
| Example 1-21 | 20 | 75 | FEC | 5 | 0.09 | 1.01 | — | 813 | 81 | 87 |
| Example 1-22 | 20 | 75 | FEC | 5 | 0.1 | 1.1 | — | 681 | 80 | 86 |
| Example 1-23 | 20 | 75 | FEC | 5 | 0.3 | 0.8 | — | 554 | 73 | 82 |
| Example 1-24 | 20 | 75 | FEC | 5 | 0.5 | 0.6 | — | 505 | 54 | 78 |

TABLE 2

| | Ethylene carbonate Mixing amount [% by volume] | Dimethyl carbonate Mixing amount [% by volume] | Halogenated carbonate Material | Halogenated carbonate Mixing amount [% by volume] | Mixing amount of LiFSI [mole/L] | Mixing amount of LiPF6 [mole/L] | Other additive | Operating time of current shut-off valve [h] | Discharge capacity retention rate [%] Low temperature cycle | Discharge capacity retention rate [%] High temperature cycle |
|---|---|---|---|---|---|---|---|---|---|---|
| Example 1-25 | 15 | 75 | FEC | 10 | 0.001 | 1.099 | — | 521 | 54 | 78 |
| Example 1-26 | 15 | 75 | FEC | 10 | 0.01 | 1.09 | — | 819 | 76 | 85 |
| Example 1-27 | 15 | 75 | FEC | 10 | 0.02 | 1.08 | — | 834 | 77 | 86 |
| Example 1-28 | 15 | 75 | FEC | 10 | 0.05 | 1.05 | — | 829 | 79 | 86 |
| Example 1-29 | 15 | 75 | FEC | 10 | 0.09 | 1.01 | — | 815 | 79 | 86 |
| Example 1-30 | 15 | 75 | FEC | 10 | 0.1 | 1.1 | — | 682 | 78 | 84 |
| Example 1-31 | 15 | 75 | FEC | 10 | 0.3 | 0.8 | — | 554 | 72 | 82 |
| Example 1-32 | 15 | 75 | FEC | 10 | 0.5 | 0.6 | — | 505 | 54 | 78 |
| Example 1-33 | 5 | 75 | FEC | 20 | 0.001 | 1.099 | — | 511 | 54 | 77 |
| Example 1-34 | 5 | 75 | FEC | 20 | 0.01 | 1.09 | — | 819 | 75 | 84 |
| Example 1-35 | 5 | 75 | FEC | 20 | 0.02 | 1.08 | — | 823 | 77 | 84 |
| Example 1-36 | 5 | 75 | FEC | 20 | 0.05 | 1.05 | — | 820 | 78 | 85 |
| Example 1-37 | 5 | 75 | FEC | 20 | 0.09 | 1.01 | — | 808 | 79 | 85 |
| Example 1-38 | 5 | 75 | FEC | 20 | 0.1 | 1.1 | — | 672 | 77 | 83 |
| Example 1-39 | 5 | 75 | FEC | 20 | 0.3 | 0.8 | — | 543 | 72 | 82 |
| Example 1-40 | 5 | 75 | FEC | 20 | 0.5 | 0.6 | — | 503 | 54 | 78 |
| Example 1-41 | 0 | 50 | FEC | 50 | 0.001 | 1.099 | — | 508 | 53 | 77 |
| Example 1-42 | 0 | 50 | FEC | 50 | 0.01 | 1.09 | — | 709 | 60 | 80 |
| Example 1-43 | 0 | 50 | FEC | 50 | 0.02 | 1.08 | — | 720 | 62 | 81 |
| Example 1-44 | 0 | 50 | FEC | 50 | 0.05 | 1.05 | — | 722 | 64 | 83 |
| Example 1-45 | 0 | 50 | FEC | 50 | 0.09 | 1.01 | — | 716 | 65 | 84 |
| Example 1-46 | 0 | 50 | FEC | 50 | 0.1 | 1.1 | — | 616 | 64 | 84 |
| Example 1-47 | 0 | 50 | FEC | 50 | 0.3 | 0.8 | — | 513 | 62 | 81 |
| Example 1-48 | 0 | 50 | FEC | 50 | 0.5 | 0.6 | — | 500 | 53 | 78 |

TABLE 3

| | Ethylene carbonate Mixing amount [% by volume] | Dimethyl carbonate Mixing amount [% by volume] | Halogenated carbonate Material | Halogenated carbonate Mixing amount [% by volume] | Mixing amount of LiFSI [mole/L] | Mixing amount of LiPF6 [mole/L] | Other additive | Operating time of current shut-off valve [h] | Discharge capacity retention rate [%] Low temperature cycle | Discharge capacity retention rate [%] High temperature cycle |
|---|---|---|---|---|---|---|---|---|---|---|
| Comparative Example 1-1 | 25 | 75 | No | — | No | 1.1 | — | 488 | 50 | 66 |
| Comparative Example 1-2 | 20 | 75 | No | — | 0.05 | 1.05 | — | 492 | 50 | 67 |
| Comparative Example 1-3 | 20 | 75 | FEC | 5 | No | 1.1 | — | 476 | 52 | 66 |
| Comparative Example 1-4 | 20 | 75 | FEC | 5 | 1.1 | 0 | — | 391 | 12 | 15 |
| Comparative Example 1-5 | 0 | 15 | FEC | 85 | 0.05 | 1.05 | — | 301 | 35 | 55 |
| Comparative Example 1-6 | 20 | 75 | FEC | 5 | No | 1.05 | LiTFSI 0.05 moles/L | 498 | 50 | 72 |
| Comparative Example 1-7 | 20 | 75 | FEC | 5 | No | 1.1 | Formula (13) 0.05 moles/L | 496 | 46 | 74 |
| Comparative Example 1-8 | 20 | 55 | No | — | 0.05 | 1.05 | VC 5% by volume | 380 | 33 | 75 |

It was noted from Tables 1 to 3 that in Examples 1-1 to 1-48 containing both FEC as the nonaqueous solvent and LiFSI as the electrolyte salt in the nonaqueous electrolyte, the operating time of the current shut-off valve is long, and the capacity retention rate at each of a low temperature and a high temperature is high. In particular, as is noted from the comparison between Comparative Example 1-4 and Comparative Example 1-5, in the case where the addition amount of LiFSI is 1.1 moles/L, and LiPF$_6$ is not used as the electrolyte salt, the battery characteristics are remarkably lowered. Furthermore, it was noted that in the case where the mixing amount of LiFSI as the nonaqueous solvent is too large, the battery characteristics are also remarkably lowered.

It may be considered that this was caused due to the matter that by adding LiFSI, a film was formed on the electrode surface, so that the decomposition reaction of the electrolytic solution could be suppressed.

Also, in Comparative Examples 1-6 and 1-7 using LiTFSI and ethanedisulfonyl difluoride (represented by the formula (13)), respectively in place of LiFSI, though the high temperature cycle characteristics were slightly inferior to those in the Examples, the low temperature cycle characteristics were remarkably lowered. Further, in Comparative Example 1-8 using vinylene carbonate (VC) in place of FEC, the low temperature cycle characteristic was remarkably lowered similarly.

It was noted from the foregoing results that the deterioration of the cycle characteristics even in a low temperature region and a high temperature region can be suppressed by jointly using the imide salt (LiFSI) according to the first embodiment and FEC which is the halogenated carbonate. Also, it was noted that when LiFSI is contained in an amount of preferably 0.001 moles/L or more and not more than 0.5 moles/L, more preferably 0.01 moles/L or more and not more than 0.3 moles/L, and still more preferably 0.01 moles/L or more and not more than 0.1 moles/L, the battery characteristics are enhanced. Furthermore, it was noted that when FEC is contained in an amount of 0.1% by volume or more and not more than 50% by volume, the battery characteristics are enhanced.

Example 2

In Example 2, the battery characteristics were evaluated by changing a composition of a nonaqueous solvent.

Example 2-1

A mixture of ethylene carbonate (EC), dimethyl carbonate (DMC) and 4-fluoro-1,3-dioxolan-2-one (FEC) in a proportion of 4/95/1 in terms of a volume ratio was used as the nonaqueous solvent. As the electrolytic salt, 0.05 moles/L of lithium bis(fluorosulfonyl)imide (LiFSI) and 1.05 moles/L of lithium hexafluorophosphate (LiPF$_6$) were used and dissolved in the nonaqueous solvent to prepare a nonaqueous electrolytic solution. A nonaqueous electrolyte battery was fabricated in the same manner as in Example 1-1, except for this.

Examples 2-2 to 2-6

Nonaqueous electrolyte batteries were fabricated in the same manner as in Example 2-1, except for changing the mixing amount of ethylene carbonate (EC) and dimethyl carbonate (DMC) in the nonaqueous solvent as shown in Table 4.

Examples 2-7 to 2-16

Nonaqueous electrolyte batteries were fabricated in the same manner as in Example 2-1, except for setting up the mixing amount of 4-fluoro-1,3-dioxolan-2-one (FEC) in the nonaqueous solvent at 5% by volume and changing the mixing amounts of ethylene carbonate (EC) and dimethyl carbonate (DMC) in the nonaqueous solvent as shown in Table 4. In Examples 2-10 and 2-11, propylene carbonate (PC) was further mixed; and in Examples 2-12 and 2-13, ethyl methyl carbonate (EMC) was further mixed.

Examples 2-17 to 2-21

Nonaqueous electrolyte batteries were fabricated in the same manner as in Example 2-1, except for setting up the mixing amount of 4-fluoro-1,3-dioxolan-2-one (FEC) in the nonaqueous solvent at 20% by volume and changing the mixing amounts of ethylene carbonate (EC) and dimethyl carbonate (DMC) in the nonaqueous solvent as shown in Table 4.

Comparative Example 2-1

4-Fluoro-1,3-dioxolan-2-one (FEC) which is a halogenated carbonate and lithium bis(fluorosulfonyl)imide (LiFSI) were not added. As other composition, one shown in Table 4 was used, thereby fabricating a nonaqueous electrolyte battery.

Comparative Example 2-2

4-Fluoro-1,3-dioxolan-2-one (FEC) was not added, and the mixing amount of lithium bis(fluorosulfonyl)imide (LiFSI) was set up at 0.05 moles/L. As other composition, one shown in Table 4 was used, thereby fabricating a nonaqueous electrolyte battery.

Comparative Example 2-3

Lithium bis(fluorosulfonyl)imide (LiFSI) was not added, and the mixing amount of 4-fluoro-1,3-dioxolan-2-one (FEC) was set up at 5% by volume. As other composition, one shown in Table 4 was used, thereby fabricating a nonaqueous electrolyte battery.

Comparative Example 2-4

As the electrolyte salt, LiPF6 was not added. As other composition, one shown in Table 4 was used, thereby fabricating a nonaqueous electrolyte battery.

Comparative Example 2-5

As the nonaqueous solvent, ethylene carbonate (EC) was not added. As other composition, one shown in Table 4 was used, thereby fabricating a nonaqueous electrolyte battery.

Evaluation of Battery
(a) Measurement of shut-off time
(b) Low temperature cycle characteristics
(c) High temperature cycle characteristics The shut-off time, the low temperature cycle characteristics and the high temperature cycle characteristics were evaluated in the same manners as in Example 1.

Configurations of the respective Examples and Comparative Examples are shown in Table 4. Also, measurement results are shown in Table 4.

TABLE 4

| | EC Mixing amount [% by volume] | PC Mixing amount [% by volume] | DMC Mixing amount [% by volume] | EMC Mixing amount [% by volume] | Halogenated carbonate Material | Halogenated carbonate Mixing amount [% by volume] |
|---|---|---|---|---|---|---|
| Example 2-1 | 4 | — | 95 | — | FEC | 1 |
| Example 2-2 | 14 | — | 85 | — | FEC | 1 |
| Example 2-3 | 24 | — | 75 | — | FEC | 1 |
| Example 2-4 | 34 | — | 65 | — | FEC | 1 |
| Example 2-5 | 44 | — | 55 | — | FEC | 1 |
| Example 2-6 | 54 | — | 45 | — | FEC | 1 |
| Example 2-7 | 0 | — | 95 | — | FEC | 5 |
| Example 2-8 | 10 | — | 85 | — | FEC | 5 |
| Example 2-9 | 20 | — | 75 | — | FEC | 5 |
| Example 2-10 | 10 | 10 | 75 | — | FEC | 5 |
| Example 2-11 | 0 | 20 | 75 | — | FEC | 5 |
| Example 2-12 | 20 | — | 55 | 20 | FEC | 5 |
| Example 2-13 | 20 | — | 35 | 40 | FEC | 5 |
| Example 2-14 | 30 | — | 65 | — | FEC | 5 |
| Example 2-15 | 40 | — | 55 | — | FEC | 5 |
| Example 2-16 | 50 | — | 45 | — | FEC | 5 |
| Example 2-17 | 0 | — | 80 | — | FEC | 20 |
| Example 2-18 | 5 | — | 75 | — | FEC | 20 |
| Example 2-19 | 15 | — | 65 | — | FEC | 20 |
| Example 2-20 | 25 | — | 55 | — | FEC | 20 |
| Example 2-21 | 35 | — | 45 | — | FEC | 20 |
| Comparative Example 2-1 | 25 | — | 75 | — | No | — |
| Comparative Example 2-2 | 20 | — | 75 | — | No | — |
| Comparative Example 2-3 | 20 | — | 75 | — | FEC | 5 |
| Comparative Example 2-4 | 20 | — | 75 | — | FEC | 5 |
| Comparative Example 2-5 | 0 | — | 15 | — | FEC | 85 |

| | Mixing amount of LiFSI [mole/L] | Mixing amount of LiPF6 [mole/L] | Other additive | Operating time of current shut-off valve [h] | Discharge capacity retention rate [%] Low temperature cycle | Discharge capacity retention rate [%] High temperature cycle |
|---|---|---|---|---|---|---|
| Example 2-1 | 0.05 | 1.05 | — | 736 | 63 | 67 |
| Example 2-2 | 0.05 | 1.05 | — | 820 | 80 | 85 |
| Example 2-3 | 0.05 | 1.05 | — | 824 | 81 | 87 |
| Example 2-4 | 0.05 | 1.05 | — | 824 | 81 | 86 |
| Example 2-5 | 0.05 | 1.05 | — | 819 | 79 | 84 |
| Example 2-6 | 0.05 | 1.05 | — | 759 | 67 | 73 |
| Example 2-7 | 0.05 | 1.05 | — | 734 | 65 | 69 |
| Example 2-8 | 0.05 | 1.05 | — | 822 | 80 | 86 |
| Example 2-9 | 0.05 | 1.05 | — | 827 | 81 | 87 |
| Example 2-10 | 0.05 | 1.05 | — | 828 | 82 | 88 |
| Example 2-11 | 0.05 | 1.05 | — | 830 | 82 | 88 |
| Example 2-12 | 0.05 | 1.05 | — | 831 | 82 | 89 |
| Example 2-13 | 0.05 | 1.05 | — | 835 | 81 | 88 |
| Example 2-14 | 0.05 | 1.05 | — | 828 | 81 | 87 |
| Example 2-15 | 0.05 | 1.05 | — | 826 | 80 | 86 |
| Example 2-16 | 0.05 | 1.05 | — | 754 | 68 | 74 |
| Example 2-17 | 0.05 | 1.05 | — | 819 | 77 | 84 |
| Example 2-18 | 0.05 | 1.05 | — | 820 | 78 | 85 |
| Example 2-19 | 0.05 | 1.05 | — | 821 | 78 | 85 |
| Example 2-20 | 0.05 | 1.05 | — | 818 | 77 | 84 |
| Example 2-21 | 0.05 | 1.05 | — | 749 | 64 | 73 |
| Comparative Example 2-1 | No | 1.1 | — | 488 | 50 | 66 |
| Comparative Example 2-2 | 0.05 | 1.05 | — | 492 | 50 | 67 |
| Comparative Example 2-3 | No | 1.1 | — | 476 | 52 | 66 |
| Comparative Example 2-4 | 1.1 | 0 | — | 391 | 12 | 15 |
| Comparative Example 2-5 | 0.05 | 1.05 | — | 301 | 35 | 55 |

It is noted from Table 4 that the mixing ratio of the cyclic carbonate (EC, PC or FEC) to the chain carbonate (DMC or EMC) in the nonaqueous solvent is preferably in the range of from 5/95 to 45/55. Also, it was noted from Comparative Example 2-5 that even if the ratio of the cyclic carbonate to the chain carbonate falls within the foregoing range, in the case where the amount of FEC is too large, the favorable battery characteristics are not obtained.

Example 3

In Example 3, the battery characteristics of the nonaqueous electrolyte battery were evaluated by changing a material to be used as the halogenated carbonate.

Examples 3-1 to 3-8

A mixture of ethylene carbonate (EC), dimethyl carbonate (DMC) and 4,5-difluoro-1,3-dioxolan-2-one (DFEC) in a proportion of 20/75/5 in terms of a volume ratio was used as the nonaqueous solvent. As the electrolyte salt, lithium bis(fluorosulfonyl)imide (LiFSI) and lithium hexafluorophosphate ($LiPF_6$) were mixed in a proportion shown in Table 5 to prepare a nonaqueous electrolytic solution. Nonaqueous electrolyte batteries were fabricated in the same manner as in Example 1-1, except for this.

Examples 3-9 to 3-16

A mixture of ethylene carbonate (EC), dimethyl carbonate (DMC) and fluoromethyl methyl carbonate (FDMC) in a proportion of 25/70/5 in terms of a volume ratio was used as the nonaqueous solvent. As the electrolyte salt, lithium bis(fluorosulfonyl)imide (LiFSI) and lithium hexafluorophosphate (LiPF6) were mixed in a proportion shown in Table 5 to prepare a nonaqueous electrolytic solution. Nonaqueous electrolyte batteries were fabricated in the same manner as in Example 3-1, except for this.

Examples 3-17 to 3-24

A mixture of ethylene carbonate (EC), dimethyl carbonate (DMC) and bis(fluoromethyl) carbonate (DFDMC) in a proportion of 25/70/5 in terms of a volume ratio was used as the nonaqueous solvent. As the electrolyte salt, lithium bis(fluorosulfonyl)imide (LiFSI) and lithium hexafluorophosphate ($LiPF_6$) were mixed in a proportion shown in Table 5 to prepare a nonaqueous electrolytic solution. Nonaqueous electrolyte batteries were fabricated in the same manner as in Example 3-1, except for this.

Comparative Example 3-1

The halogenated carbonate was not added. As the electrolyte salt, lithium bis(fluorosulfonyl)imide (LiFSI) was not added, and lithium hexafluorophosphate ($LiPF_6$) was mixed in a proportion shown in Table 6 to prepare a nonaqueous electrolytic solution. A nonaqueous electrolyte battery was fabricated in the same manner as in Example 3-1, except for this.

Comparative Example 3-2

The halogenated carbonate was not added. As the electrolyte salt, lithium bis(fluorosulfonyl)imide (LiFSI) and lithium hexafluorophosphate ($LiPF_6$) were mixed in a proportion shown in Table 6 to prepare a nonaqueous electrolytic solution. A nonaqueous electrolyte battery was fabricated in the same manner as in Example 3-1, except for this.

Comparative Examples 3-3 and 3-4

As the halogenated carbonate, 5% by volume of 4,5-difluoro-1,3-dioxolan-2-one (DFEC) was mixed. As the electrolyte salt, only either one of lithium bis(fluorosulfonyl)imide (LiFSI) or lithium hexafluorophosphate ($LiPF_6$) was mixed in a proportion shown in Table 6 to prepare a nonaqueous electrolytic solution. Nonaqueous electrolyte batteries were fabricated in the same manner as in Example 3-1, except for this.

Comparative Examples 3-5 and 3-6

As the halogenated carbonate, 5% by volume of fluoromethyl methyl carbonate (FDMC) was mixed. As the electrolyte salt, only either one of lithium bis(fluorosulfonyl)imide (LiFSI) or lithium hexafluorophosphate ($LiPF_6$) was mixed in a proportion shown in Table 6 to prepare a nonaqueous electrolytic solution. Nonaqueous electrolyte batteries were fabricated in the same manner as in Example 3-1, except for this.

Comparative Examples 3-7 and 3-8

As the halogenated carbonate, 5% by volume of bis(fluoromethyl) carbonate (DFDMC) was mixed. As the electrolyte salt, only either one of lithium bis(fluorosulfonyl)imide (LiFSI) or lithium hexafluorophosphate ($LiPF_6$) was mixed in a proportion shown in Table 6 to prepare a nonaqueous electrolytic solution. Nonaqueous electrolyte batteries were fabricated in the same manner as in Example 3-1, except for this.

Evaluation of Battery
(a) Measurement of shut-off time
(b) Low temperature cycle characteristics
(c) High temperature cycle characteristics The shut-off time, the low temperature cycle characteristics and the high temperature cycle characteristics were evaluated in the same manners as in Example 1.

Configurations of the respective Examples and Comparative Examples are shown in Tables 5 and 6. Also, measurement results are shown in Tables 5 and 6.

TABLE 5

| | Ethylene carbonate Mixing amount [% by volume] | Dimethyl carbonate Mixing amount [% by volume] | Halogenated carbonate Material | Halogenated carbonate Mixing amount [% by volume] | Mixing amount of LiFSI [mole/L] | Mixing amount of LiPF6 [mole/L] | Operating time of current shut-off valve [h] | Discharge capacity retention rate [%] Low temperature cycle | Discharge capacity retention rate [%] High temperature cycle |
|---|---|---|---|---|---|---|---|---|---|
| Example 3-1 | 20 | 75 | DFEC | 5 | 0.001 | 1.099 | 518 | 53 | 78 |
| Example 3-2 | 20 | 75 | DFEC | 5 | 0.01 | 1.09 | 814 | 77 | 85 |

TABLE 5-continued

| | Ethylene carbonate Mixing amount [% by volume] | Dimethyl carbonate Mixing amount [% by volume] | Halogenated carbonate Material | Halogenated carbonate Mixing amount [% by volume] | Mixing amount of LiFSI [mole/L] | Mixing amount of LiPF6 [mole/L] | Operating time of current shut-off valve [h] | Discharge capacity retention rate [%] Low temperature cycle | Discharge capacity retention rate [%] High temperature cycle |
|---|---|---|---|---|---|---|---|---|---|
| Example 3-3 | 20 | 75 | DFEC | 5 | 0.02 | 1.08 | 830 | 81 | 86 |
| Example 3-4 | 20 | 75 | DFEC | 5 | 0.05 | 1.05 | 825 | 82 | 86 |
| Example 3-5 | 20 | 75 | DFEC | 5 | 0.09 | 1.01 | 810 | 81 | 86 |
| Example 3-6 | 20 | 75 | DFEC | 5 | 0.1 | 1.1 | 678 | 81 | 86 |
| Example 3-7 | 20 | 75 | DFEC | 5 | 0.3 | 0.8 | 553 | 74 | 82 |
| Example 3-8 | 20 | 75 | DFEC | 5 | 0.5 | 0.6 | 504 | 54 | 78 |
| Example 3-9 | 25 | 70 | FDMC | 5 | 0.001 | 1.099 | 521 | 53 | 78 |
| Example 3-10 | 25 | 70 | FDMC | 5 | 0.01 | 1.09 | 819 | 73 | 83 |
| Example 3-11 | 25 | 70 | FDMC | 5 | 0.02 | 1.08 | 834 | 77 | 83 |
| Example 3-12 | 25 | 70 | FDMC | 5 | 0.05 | 1.05 | 829 | 79 | 84 |
| Example 3-13 | 25 | 70 | FDMC | 5 | 0.09 | 1.01 | 813 | 79 | 84 |
| Example 3-14 | 25 | 70 | FDMC | 5 | 0.1 | 1.1 | 683 | 79 | 84 |
| Example 3-15 | 25 | 70 | FDMC | 5 | 0.3 | 0.8 | 555 | 69 | 80 |
| Example 3-16 | 25 | 70 | FDMC | 5 | 0.5 | 0.6 | 506 | 53 | 78 |
| Example 3-17 | 25 | 70 | DFDMC | 5 | 0.001 | 1.099 | 525 | 53 | 78 |
| Example 3-18 | 25 | 70 | DFDMC | 5 | 0.01 | 1.09 | 821 | 76 | 84 |
| Example 3-19 | 25 | 70 | DFDMC | 5 | 0.02 | 1.08 | 838 | 79 | 85 |
| Example 3-20 | 25 | 70 | DFDMC | 5 | 0.05 | 1.05 | 833 | 80 | 86 |
| Example 3-21 | 25 | 70 | DFDMC | 5 | 0.09 | 1.01 | 819 | 80 | 86 |
| Example 3-22 | 25 | 70 | DFDMC | 5 | 0.1 | 1.1 | 684 | 79 | 85 |
| Example 3-23 | 25 | 70 | DFDMC | 5 | 0.3 | 0.8 | 557 | 70 | 81 |
| Example 3-24 | 25 | 70 | DFDMC | 5 | 0.5 | 0.6 | 507 | 54 | 78 |

TABLE 6

| | Ethylene carbonate Mixing amount [% by volume] | Dimethyl carbonate Mixing amount [% by volume] | Halogenated carbonate Material | Halogenated carbonate Mixing amount [% by volume] | Mixing amount of LiFSI [mole/L] | Mixing amount of LiPF6 [mole/L] | Operating time of current shut-off valve [h] | Discharge capacity retention rate [%] Low temperature cycle | Discharge capacity retention rate [%] High temperature cycle |
|---|---|---|---|---|---|---|---|---|---|
| Comparative Example 3-1 | 25 | 75 | No | — | No | 1.1 | 488 | 50 | 66 |
| Comparative Example 3-2 | 25 | 75 | No | — | 0.05 | 1.05 | 492 | 50 | 67 |
| Comparative Example 3-3 | 25 | 75 | DFEC | 5 | No | 1.1 | 474 | 52 | 65 |
| Comparative Example 3-4 | 25 | 75 | DFEC | 5 | 1.1 | 0 | 385 | 13 | 15 |
| Comparative Example 3-5 | 25 | 70 | FDMC | 5 | No | 1.1 | 489 | 50 | 64 |
| Comparative Example 3-6 | 25 | 70 | FDMC | 5 | 1.1 | 0 | 392 | 10 | 12 |
| Comparative Example 3-7 | 25 | 70 | DFDMC | 5 | No | 1.1 | 492 | 50 | 65 |
| Comparative Example 3-8 | 25 | 70 | DFDMC | 5 | 1.1 | 0 | 398 | 11 | 15 |

As is noted from Tables 5 and 6, even in the case of using, as the halogenated carbonate, 4,5-difluoro-1,3-dioxolan-2-one (DFEC), fluoromethyl methyl carbonate (FDMC) or bis(fluoromethyl) carbonate (DFDMC), the same battery characteristics as those in the case of using 4-fluoro-1,3-dioxolan-2-one (FEC) could be obtained.

Also, as is noted from Comparative Examples 3-3 to 3-8, in the case where lithium bis(fluorosulfonyl)imide (LiFSI) and lithium hexafluorophosphate (LiPF$_6$) were not used jointly as the electrolytic salt, the battery characteristics were lowered.

Example 4

In Example 4, the battery characteristics were evaluated by changing a charge voltage of a nonaqueous electrolyte battery.

Examples 4-1 to 4-4

As the nonaqueous solvent, a mixture of ethylene carbonate (EC), dimethyl carbonate (DMC) and 4-fluoro-1,3-dioxolan-2-one (FEC) in a proportion of 24/75/1 in terms of a volume ratio was used. Also, as the electrolytic salt, 0.001 moles/L of lithium bis(fluorosulfonyl)imide (LiFSI) and lithium hexafluorophosphate (LiPF$_6$) in a proportion shown in Table 7 were mixed and dissolved in the nonaqueous solvent to prepare a nonaqueous electrolytic solution. The charge voltage on the occasion of subsequent evaluation of the battery characteristics was set up at 4.2 V.

Examples 4-5 to 4-8

As the nonaqueous solvent, a mixture of ethylene carbonate (EC), dimethyl carbonate (DMC) and 4-fluoro-1,3-dioxolan-2-one (FEC) in a proportion of 5/75/20 in terms of a volume ratio was used. Also, as the electrolytic salt, 0.001 moles/L of lithium bis(fluorosulfonyl)imide (LiFSI) and lithium hexafluorophosphate (LiPF$_6$) in a proportion shown in Table 7 were mixed and dissolved in the nonaqueous solvent to prepare a nonaqueous electrolytic solution. The charge voltage on the occasion of subsequent evaluation of the battery characteristics was set up at 4.2 V.

Examples 4-9 to 4-12

As the nonaqueous solvent, a mixture of ethylene carbonate (EC), dimethyl carbonate (DMC) and 4-fluoro-1,3-dioxolan-2-one (FEC) in a proportion of 24/75/1 in terms of a volume ratio was used. Also, as the electrolytic salt, 0.001 moles/L of lithium bis(fluorosulfonyl)imide (LiFSI) and lithium hexafluorophosphate (LiPF$_6$) in a proportion shown in Table 7 were mixed and dissolved in the nonaqueous solvent to prepare a nonaqueous electrolytic solution. The charge voltage on the occasion of subsequent evaluation of the battery characteristics was set up at 4.35 V.

Examples 4-13 to 4-16

As the nonaqueous solvent, a mixture of ethylene carbonate (EC), dimethyl carbonate (DMC) and 4-fluoro-1,3-dioxolan-2-one (FEC) in a proportion of 5/75/20 in terms of a volume ratio was used. Also, as the electrolytic salt, 0.001 moles/L of lithium bis(fluorosulfonyl)imide (LiFSI) and lithium hexafluorophosphate (LiPF$_6$) in a proportion shown in Table 7 were mixed and dissolved in the nonaqueous solvent to prepare a nonaqueous electrolytic solution. The charge voltage on the occasion of subsequent evaluation of the battery characteristics was set up at 4.35 V.

Examples 4-17 to 4-20

As the nonaqueous solvent, a mixture of ethylene carbonate (EC), dimethyl carbonate (DMC) and 4-fluoro-1,3-dioxolan-2-one (FEC) in a proportion of 24/75/1 in terms of a volume ratio was used. Also, as the electrolytic salt, 0.001 moles/L of lithium bis(fluorosulfonyl)imide (LiFSI) and lithium hexafluorophosphate (LiPF$_6$) in a proportion shown in Table 7 were mixed and dissolved in the nonaqueous solvent to prepare a nonaqueous electrolytic solution. The charge voltage on the occasion of subsequent evaluation of the battery characteristics was set up at 4.45 V.

Examples 4-21 to 4-24

As the nonaqueous solvent, a mixture of ethylene carbonate (EC), dimethyl carbonate (DMC) and 4-fluoro-1,3-dioxolan-2-one (FEC) in a proportion of 5/75/20 in terms of a volume ratio was used. Also, as the electrolytic salt, 0.001 moles/L of lithium bis(fluorosulfonyl)imide (LiFSI) and lithium hexafluorophosphate (LiPF$_6$) in a proportion shown in Table 7 were mixed and dissolved in the nonaqueous solvent to prepare a nonaqueous electrolytic solution. The charge voltage on the occasion of subsequent evaluation of the battery characteristics was set up at 4.45 V.

Comparative Examples 4-1 and 4-2

As the nonaqueous solvent, 4-fluoro-1,3-dioxolan-2-one (FEC) was not mixed. Also, as the electrolytic salt, 0.001 moles/L of lithium bis(fluorosulfonyl)imide (LiFSI) and lithium hexafluorophosphate (LiPF$_6$) in a proportion shown in Table 8 were mixed and dissolved in the nonaqueous solvent to prepare a nonaqueous electrolytic solution. The charge voltage on the occasion of subsequent evaluation of the battery characteristics was set up at 4.35 V.

Comparative Examples 4-3 and 4-4

As the nonaqueous solvent, a mixture of ethylene carbonate (EC), dimethyl carbonate (DMC) and 4-fluoro-1,3-dioxolan-2-one (FEC) in a proportion of 24/75/1 in terms of a volume ratio was used. Also, as the electrolyte salt, only either one of lithium bis(fluorosulfonyl)imide (LiFSI) or lithium hexafluorophosphate (LiPF$_6$) was mixed in a proportion shown in Table 8 and dissolved in the nonaqueous solvent to prepare a nonaqueous electrolytic solution. The charge voltage on the occasion of subsequent evaluation of the battery characteristics was set up at 4.35 V.

Comparative Example 4-5

As the nonaqueous solvent, ethylene carbonate (EC) was not mixed, and a mixture of dimethyl carbonate (DMC) and 4-fluoro-1,3-dioxolan-2-one (FEC) in a proportion of 15/85 in terms of a volume ratio was used. Also, as the electrolyte salt, 1 mole/L of lithium bis(fluorosulfonyl)imide (LiFSI) and 1.1 moles/L of lithium hexafluorophosphate (LiPF$_6$) were mixed and dissolved in the nonaqueous solvent to prepare a nonaqueous electrolytic solution. The charge voltage on the occasion of subsequent evaluation of the battery characteristics was set up at 4.35 V.

Comparative Examples 4-6 and 4-7

As the nonaqueous solvent, 4-fluoro-1,3-dioxolan-2-one (FEC) was not mixed. Also, as the electrolyte salt, 0.001 moles/L of lithium bis(fluorosulfonyl)imide (LiFSI) and lithium hexafluorophosphate (LiPF$_6$) in a proportion shown in Table 8 were mixed and dissolved in the nonaqueous solvent to prepare a nonaqueous electrolytic solution. The charge voltage on the occasion of subsequent evaluation of the battery characteristics was set up at 4.45 V.

Comparative Examples 4-8 and 4-9

As the nonaqueous solvent, a mixture of ethylene carbonate (EC), dimethyl carbonate (DMC) and 4-fluoro-1,3-dioxolan-2-one (FEC) in a proportion of 24/75/1 in terms of a volume ratio was used. Also, as the electrolyte salt, only either one of lithium bis(fluorosulfonyl)imide (LiFSI) or lithium hexafluorophosphate (LiPF$_6$) was mixed in a proportion shown in Table 8 and dissolved in the nonaqueous solvent to prepare a nonaqueous electrolytic solution. The charge voltage on the occasion of subsequent evaluation of the battery characteristics was set up at 4.45 V.

Comparative Example 4-10

As the nonaqueous solvent, ethylene carbonate (EC) was not mixed, and a mixture of dimethyl carbonate (DMC) and 4-fluoro-1,3-dioxolan-2-one (FEC) in a proportion of 15/85 in terms of a volume ratio was used. Also, as the electrolyte salt, 1 mole/L of lithium bis(fluorosulfonyl)imide (LiFSI) and 1.1 moles/L of lithium hexafluorophosphate (LiPF$_6$) were mixed and dissolved in the nonaqueous solvent to prepare a nonaqueous electrolytic solution. The charge voltage on the occasion of subsequent evaluation of the battery characteristics was set up at 4.45 V.

Evaluation of Battery
(a) Measurement of shut-off time
(b) Low temperature cycle characteristics
(c) High temperature cycle characteristics The shut-off time, the low temperature cycle characteristics and the high temperature cycle characteristics were evaluated in the same manners as in Example 1.

Configurations of the respective Examples and Comparative Examples are shown in Tables 7 and 8. Also, measurement results are shown in Tables 7 and 8.

TABLE 7

| | Charge voltage [V] | Ethylene carbonate Mixing amount [% by volume] | Dimethyl carbonate Mixing amount [% by volume] | Halogenated carbonate Material | Halogenated carbonate Mixing amount [% by volume] | Mixing amount of LiFSI [mole/L] | Mixing amount of LiPF6 [mole/L] | Operating time of current shut-off valve [h] | Discharge capacity retention rate [%] Low temperature cycle | Discharge capacity retention rate [%] High temperature cycle |
|---|---|---|---|---|---|---|---|---|---|---|
| Example 4-1 | 4.2 | 24 | 75 | FEC | 1 | 0.01 | 1.09 | 817 | 77 | 86 |
| Example 4-2 | | 24 | 75 | FEC | 1 | 0.05 | 1.05 | 827 | 81 | 87 |
| Example 4-3 | | 24 | 75 | FEC | 1 | 0.09 | 1.01 | 813 | 80 | 86 |
| Example 4-4 | | 24 | 75 | FEC | 1 | 0.3 | 0.8 | 554 | 73 | 82 |
| Example 4-5 | | 5 | 75 | FEC | 20 | 0.01 | 1.09 | 819 | 75 | 84 |
| Example 4-6 | | 5 | 75 | FEC | 20 | 0.05 | 1.05 | 820 | 78 | 85 |
| Example 4-7 | | 5 | 75 | FEC | 20 | 0.09 | 1.01 | 808 | 77 | 83 |
| Example 4-8 | | 5 | 75 | FEC | 20 | 0.3 | 0.8 | 543 | 72 | 82 |
| Example 4-9 | 4.35 | 24 | 75 | FEC | 1 | 0.01 | 1.09 | 715 | 75 | 82 |
| Example 4-10 | | 24 | 75 | FEC | 1 | 0.05 | 1.05 | 727 | 79 | 83 |
| Example 4-11 | | 24 | 75 | FEC | 1 | 0.09 | 1.01 | 712 | 78 | 82 |
| Example 4-12 | | 24 | 75 | FEC | 1 | 0.3 | 0.8 | 453 | 70 | 80 |
| Example 4-13 | | 5 | 75 | FEC | 20 | 0.01 | 1.09 | 718 | 73 | 81 |
| Example 4-14 | | 5 | 75 | FEC | 20 | 0.05 | 1.05 | 728 | 76 | 82 |
| Example 4-15 | | 5 | 75 | FEC | 20 | 0.09 | 1.01 | 715 | 75 | 81 |
| Example 4-16 | | 5 | 75 | FEC | 20 | 0.3 | 0.8 | 454 | 69 | 78 |
| Example 4-17 | 4.45 | 24 | 75 | FEC | 1 | 0.01 | 1.09 | 679 | 64 | 80 |
| Example 4-18 | | 24 | 75 | FEC | 1 | 0.05 | 1.05 | 685 | 68 | 81 |
| Example 4-19 | | 24 | 75 | FEC | 1 | 0.09 | 1.01 | 673 | 67 | 80 |
| Example 4-20 | | 24 | 75 | FEC | 1 | 0.3 | 0.8 | 402 | 60 | 77 |
| Example 4-21 | | 5 | 75 | FEC | 20 | 0.01 | 1.09 | 682 | 60 | 77 |
| Example 4-22 | | 5 | 75 | FEC | 20 | 0.05 | 1.05 | 689 | 62 | 79 |
| Example 4-23 | | 5 | 75 | FEC | 20 | 0.09 | 1.01 | 680 | 61 | 79 |
| Example 4-24 | | 5 | 75 | FEC | 20 | 0.3 | 0.8 | 405 | 59 | 76 |

TABLE 8

| | Charge voltage [V] | Ethylene carbonate Mixing amount [% by volume] | Dimethyl carbonate Mixing amount [% by volume] | Halogenated carbonate Material | Halogenated carbonate Mixing amount [% by volume] | Mixing amount of LiFSI [mole/L] | Mixing amount of LiPF6 [mole/L] | Operating time of current shut-off valve [h] | Discharge capacity retention rate [%] Low temperature cycle | Discharge capacity retention rate [%] High temperature cycle |
|---|---|---|---|---|---|---|---|---|---|---|
| Comparative Example 4-1 | 4.35 | 25 | 75 | No | — | No | 1.1 | 365 | 45 | 58 |
| Comparative Example 4-2 | | 25 | 75 | No | — | 0.05 | 1.05 | 368 | 45 | 60 |
| Comparative Example 4-3 | | 24 | 75 | FEC | 1 | No | 1.1 | 363 | 46 | 59 |
| Comparative Example 4-4 | | 24 | 75 | FEC | 1 | 1.1 | 0 | 244 | 9 | 11 |

TABLE 8-continued

| | Charge voltage [V] | Ethylene carbonate Mixing amount [% by volume] | Dimethyl carbonate Mixing amount [% by volume] | Halogenated carbonate Material | Halogenated carbonate Mixing amount [% by volume] | Mixing amount of LiFSI [mole/L] | Mixing amount of LiPF6 [mole/L] | Operating time of current shut-off valve [h] | Discharge capacity retention rate [%] Low temperature cycle | Discharge capacity retention rate [%] High temperature cycle |
|---|---|---|---|---|---|---|---|---|---|---|
| Comparative Example 4-5 | | 0 | 15 | FEC | 85 | 0.1 | 1.1 | 167 | 31 | 40 |
| Comparative Example 4-6 | 4.45 | 25 | 75 | No | — | No | 1.1 | 305 | 40 | 41 |
| Comparative Example 4-7 | | 25 | 75 | No | — | 0.05 | 1.05 | 309 | 40 | 42 |
| Comparative Example 4-8 | | 24 | 75 | FEC | 1 | No | 1.1 | 303 | 42 | 41 |
| Comparative Example 4-9 | | 24 | 75 | FEC | 1 | 1.1 | 0 | 234 | 5 | 6 |
| Comparative Example 4-10 | | 0 | 15 | FEC | 85 | 0.05 | 1.05 | 165 | 15 | 25 |

As is noted from Tables 7 and 8, even in the case where the charge voltage was 4.35 V or more, the high cycle characteristics could be realized. In particular, even when the charge voltage was 4.45 V, the cycle characteristics at high temperatures of about 80% or more could be realized. Also, as is noted from the comparison with Comparative Examples 4-1 to 4-10, in the case of not using the imide salt (LiFSI) according to the first embodiment, the cycle characteristics were lowered, and the operating time of the current shut-off valve became short. By mixing the halogenated carbonate together with the cyclic carbonate and the chain carbonate as the nonaqueous solvent and jointly using, as the electrolyte salt, the imide salt according to the first embodiment and an electrolyte salt of the related art, high battery characteristics were obtained regardless of the charge voltage.

Example 5

In Example 5, the battery characteristics in the case of using a silicon material as the material of the negative electrode were evaluated.

Examples 5-1 to 5-12

Fabrication of Negative Electrode

A negative electrode active material layer made of silicon was formed on the both surfaces of a negative electrode collector made of a copper foil (15 μm in thickness) by an electrode beam vapor deposition method, thereby fabricating a negative electrode. Thereafter, a nickel-made negative electrode lead was installed in one end of the negative electrode collector.

Electrolytic Solution

As to an electrolytic solution, as the nonaqueous solvent, a mixture of ethylene carbonate (EC), dimethyl carbonate (DMC) and 4-fluoro-1,3-dixolan-2-one (FEC) was used. Also, as the electrolyte salt, a mixture of lithium bis(fluorosulfonyl)imide (LiFSI) and lithium hexafluorophosphate (LiPF6) was used. The respective mixing ratios are shown in Table 9.

Nonaqueous electrolyte batteries were fabricated in the same manner as in Example 1-1, except for this.

Examples 5-13 to 5-16

Nonaqueous electrolyte batteries were fabricated in the same manner as in Examples 5-5 to 5-8, except for using 4,5-difluoro-1,3-dioxolan-2-one (DFEC) as the halogenated carbonate.

Examples 5-17 to 5-20

Nonaqueous electrolyte batteries were fabricated in the same manner as in Examples 5-5 to 5-8, except for using fluoromethyl methyl carbonate (FDMC) as the halogenated carbonate.

Examples 5-21 to 5-24

Nonaqueous electrolyte batteries were fabricated in the same manner as in Examples 5-5 to 5-8, except for using bis(fluoromethyl) carbonate (DFDMC) as the halogenated carbonate.

Comparative Examples 5-1 and 5-2

As the nonaqueous solvent, the halogenated carbonate was not mixed. The electrolyte salt was mixed as shown in Table 10. Nonaqueous electrolyte batteries were fabricated in the same manner as in Example 5-1, except for this.

Comparative Examples 5-3 to 5-5

As the halogenated carbonate, 4-fluoro-1,3-dixolan-2-one (FEC) was used. The electrolyte salt was mixed as shown in Table 10. Nonaqueous electrolyte batteries were fabricated in the same manner as in Example 5-1, except for this.

Comparative Examples 5-6 and 5-7

As the halogenated carbonate, 4,5-difluoro-1,3-dioxolan-2-one (DFEC) was used. As the electrolyte salt, only either one of lithium bis(fluorosulfonyl)imide (LiFSI) or lithium hexafluorophosphate (LiPF$_6$) was mixed as shown in Table 10. Nonaqueous electrolyte batteries were fabricated in the same manner as in Example 5-1, except for this.

Comparative Examples 5-8 and 5-9

As the halogenated carbonate, fluoromethyl methyl carbonate (FDMC) was used. As the electrolyte salt, only either one of lithium bis(fluorosulfonyl)imide (LiFSI) or lithium hexafluorophosphate (LiPF$_6$) was mixed as shown in Table 10. Nonaqueous electrolyte batteries were fabricated in the same manner as in Example 5-1, except for this.

Comparative Examples 5-10 and 5-11

As the halogenated carbonate, bis(fluoromethyl) carbonate (DFDMC) was used. As the electrolyte salt, only either one of lithium bis(fluorosulfonyl)imide (LiFSI) or lithium hexafluorophosphate (LiPF$_6$) was mixed as shown in Table 10. Nonaqueous electrolyte batteries were fabricated in the same manner as in Example 5-1, except for this.

Comparative Example 5-12

As the halogenated carbonate, 4-fluoro-1,3-dioxolan-2-one (FEC) was used. As the electrolyte salt, lithium bis(trifluoromethanesulfonyl)imide (LiTFSI) was used as shown in Table 10 in place of lithium bis(fluorosulfonyl)imide (LiFSI), and its mixing amount was set up at 0.05 moles/L. A nonaqueous electrolyte battery was fabricated in the same manner as in Example 5-1, except for this.

Comparative Example 5-13

As the halogenated carbonate, 4-fluoro-1,3-dioxolan-2-one (FEC) was used. As the electrolyte salt, ethanedisulfonyl difluoride (represented by the formula (13)) was used as shown in Table 10 in place of lithium hexafluorophosphate (LiPF$_6$), and its mixing amount was set up at 0.05 moles/L. A nonaqueous electrolyte battery was fabricated in the same manner as in Example 5-1, except for this.

Comparative Example 5-14

The halogenated carbonate was not mixed. A nonaqueous electrolyte battery was fabricated in the same manner as in Example 5-1, except for using, as the electrolyte salt, a mixture of FEC and LiPF$_6$ as shown in Table 10.

Evaluation of Battery
(a) Measurement of shut-off time
(b) Low temperature cycle characteristics
(c) High temperature cycle characteristics The shut-off time, the low temperature cycle characteristics and the high temperature cycle characteristics were evaluated in the same manners as in Example 1.

Configurations of the respective Examples and Comparative Examples are shown in Tables 9 and 10. Also, measurement results are shown in Tables 9 and 10.

TABLE 9

| | Ethylene carbonate Mixing amount [% by volume] | Dimethyl carbonate Mixing amount [% by volume] | Halogenated carbonate Material | Halogenated carbonate Mixing amount [% by volume] | Mixing amount of LiFSI [mole/L] | Mixing amount of LiPF6 [mole/L] | Other additive | Operating time of current shut-off valve [h] | Discharge capacity retention rate [%] Low temperature cycle | Discharge capacity retention rate [%] High temperature cycle |
|---|---|---|---|---|---|---|---|---|---|---|
| Example 5-1 | 24 | 75 | FEC | 1 | 0.01 | 1.09 | — | 579 | 58 | 68 |
| Example 5-2 | 24 | 75 | FEC | 1 | 0.05 | 1.05 | — | 584 | 64 | 73 |
| Example 5-3 | 24 | 75 | FEC | 1 | 0.09 | 1.01 | — | 576 | 65 | 75 |
| Example 5-4 | 24 | 75 | FEC | 1 | 0.3 | 0.8 | — | 396 | 62 | 74 |
| Example 5-5 | 20 | 75 | FEC | 5 | 0.01 | 1.09 | — | 581 | 59 | 69 |
| Example 5-6 | 20 | 75 | FEC | 5 | 0.05 | 1.05 | — | 587 | 65 | 74 |
| Example 5-7 | 20 | 75 | FEC | 5 | 0.09 | 1.01 | — | 578 | 65 | 75 |
| Example 5-8 | 20 | 75 | FEC | 5 | 0.3 | 0.8 | — | 400 | 63 | 73 |
| Example 5-9 | 5 | 75 | FEC | 20 | 0.01 | 1.09 | — | 582 | 58 | 68 |
| Example 5-10 | 5 | 75 | FEC | 20 | 0.05 | 1.05 | — | 589 | 64 | 73 |
| Example 5-11 | 5 | 75 | FEC | 20 | 0.09 | 1.01 | — | 580 | 64 | 74 |
| Example 5-12 | 5 | 75 | FEC | 20 | 0.3 | 0.8 | — | 401 | 61 | 73 |
| Example 5-13 | 20 | 75 | DFEC | 5 | 0.01 | 1.09 | — | 579 | 59 | 70 |
| Example 5-14 | 20 | 75 | DFEC | 5 | 0.05 | 1.05 | — | 583 | 64 | 75 |
| Example 5-15 | 20 | 75 | DFEC | 5 | 0.09 | 1.01 | — | 577 | 64 | 76 |
| Example 5-16 | 20 | 75 | DFEC | 5 | 0.3 | 0.8 | — | 398 | 62 | 73 |
| Example 5-17 | 25 | 70 | FDMC | 5 | 0.01 | 1.09 | — | 582 | 48 | 61 |
| Example 5-18 | 25 | 70 | FDMC | 5 | 0.05 | 1.05 | — | 588 | 55 | 66 |
| Example 5-19 | 25 | 70 | FDMC | 5 | 0.09 | 1.01 | — | 580 | 56 | 67 |
| Example 5-20 | 25 | 70 | FDMC | 5 | 0.3 | 0.8 | — | 402 | 52 | 65 |
| Example 5-21 | 25 | 70 | DFDMC | 5 | 0.01 | 1.09 | — | 584 | 53 | 64 |
| Example 5-22 | 25 | 70 | DFDMC | 5 | 0.05 | 1.05 | — | 590 | 58 | 68 |
| Example 5-23 | 25 | 70 | DFDMC | 5 | 0.09 | 1.01 | — | 582 | 59 | 69 |
| Example 5-24 | 25 | 70 | DFDMC | 5 | 0.3 | 0.8 | — | 405 | 56 | 67 |

TABLE 10

| | Ethylene carbonate Mixing amount [% by volume] | Dimethyl carbonate Mixing amount [% by volume] | Halogenated carbonate Material | Halogenated carbonate Mixing amount [% by volume] | Mixing amount of LiFSI [mole/L] | Mixing amount of LiPF6 [mole/L] | Other additive | Operating time of current shut-off valve [h] | Discharge capacity retention rate [%] Low temperature cycle | Discharge capacity retention rate [%] High temperature cycle |
|---|---|---|---|---|---|---|---|---|---|---|
| Comparative Example 5-1 | 25 | 75 | No | — | No | 1.1 | — | 256 | 28 | 46 |

TABLE 10-continued

|  | Ethylene carbonate Mixing amount [% by volume] | Dimethyl carbonate Mixing amount [% by volume] | Halogenated carbonate Material | Halogenated carbonate Mixing amount [% by volume] | Mixing amount of LiFSI [mole/L] | Mixing amount of LiPF6 [mole/L] | Other additive | Operating time of current shut-off valve [h] | Discharge capacity retention rate [%] Low temperature cycle | Discharge capacity retention rate [%] High temperature cycle |
|---|---|---|---|---|---|---|---|---|---|---|
| Comparative Example 5-2 | 25 | 75 | No | — | 0.1 | 1 | — | 260 | 29 | 47 |
| Comparative Example 5-3 | 20 | 75 | FEC | 5 | No | 1.1 | — | 253 | 31 | 46 |
| Comparative Example 5-4 | 20 | 75 | FEC | 5 | 1.1 | 0 | — | 150 | 3 | 5 |
| Comparative Example 5-5 | 0 | 15 | FEC | 85 | 0.05 | 1.05 | — | 134 | 15 | 35 |
| Comparative Example 5-6 | 20 | 75 | DFEC | 5 | No | 1.1 | — | 250 | 32 | 45 |
| Comparative Example 5-7 | 20 | 75 | DFEC | 5 | 1.1 | 0 | — | 148 | 4 | 5 |
| Comparative Example 5-8 | 25 | 70 | FDMC | 5 | No | 1.1 | — | 254 | 29 | 45 |
| Comparative Example 5-9 | 25 | 70 | FDMC | 5 | 1.1 | 0 | — | 153 | 2 | 4 |
| Comparative Example 5-10 | 25 | 70 | DFDMC | 5 | No | 1.1 | — | 258 | 30 | 46 |
| Comparative Example 5-11 | 25 | 70 | DFDMC | 5 | 1.1 | 0 | — | 155 | 3 | 4 |
| Comparative Example 5-12 | 25 | 70 | FEC | 5 | No | 1.1 | LiTFSI 0.05 moles/L | 260 | 28 | 50 |
| Comparative Example 5-13 | 25 | 70 | FEC | 5 | 1.1 | 0 | Formula (13) 0.05 moles/L | 155 | 24 | 50 |
| Comparative Example 5-14 | 25 | 70 | No | — | 0.05 | 1.05 | VC 5% | 134 | 20 | 51 |

As is noted from Tables 9 and 10, even in the case of using a silicon negative electrode as the negative electrode, the high battery characteristics could be kept. In particular, an effect for prolonging the operating time of the current shut-off valve was high, and as to the cycle characteristics, a sufficient cycle enhancing effect could also be obtained as compared with the Comparative Examples.

Example 6

In Example 6, the battery characteristics in the case of using an alloy material as the material of the negative electrode were evaluated.

Examples 6-1 to 6-12

Fabrication of Negative Electrode

First of all, a negative electrode active material was prepared. As the negative electrode active material, a tin (Sn)/cobalt (Co)/indium (In)/titanium (Ti) alloy powder was mixed with a carbon powder, and a CoSnC-containing material was then synthesized from the mixture by utilizing a mechanochemical reaction. As a result of analysis of a composition of this CoSnC-containing material, a content of tin was 48% by mass, a content of cobalt was 23% by mass, a content of carbon was 20% by mass, and a proportion of cobalt relative to the total sum of tin and cobalt (Co/(Sn+Co)) was 32% by mass.

Subsequently, 80 parts by mass of the CoSnC-containing material powder as a negative electrode active material, 12 parts by mass of graphite as a conductive agent and 8 parts by mass of polyvinylidene fluoride as a binder were mixed, and the mixture was dispersed in N-methyl-2-pyrrolidone as a solvent. Finally, the dispersion was coated on a negative electrode collector made of a copper foil (15 μm in thickness), and after drying, the resultant was compression molded by a roll press to form a negative electrode active material layer. There was thus obtained a negative electrode.

Nonaqueous electrolyte batteries were fabricated in the same manner as in Example 5-1, except for this.

Examples 6-13 to 6-16

Nonaqueous electrolyte batteries were prepared in the same manner as in Examples 6-5 to 6-8, except for using 4,5-difluoro-1,3-dioxolan-2-one (DFEC) as the halogenated carbonate.

Examples 6-17 to 6-20

Nonaqueous electrolyte batteries were prepared in the same manner as in Examples 6-5 to 6-8, except for using fluoromethyl methyl carbonate (FDMC) as the halogenated carbonate.

Examples 6-21 to 6-24

Nonaqueous electrolyte batteries were prepared in the same manner as in Examples 6-5 to 6-8, except for using bis(fluoromethyl) carbonate (DFDMC) as the halogenated carbonate.

Comparative Examples 6-1 and 6-2

As the nonaqueous solvent, the halogenated carbonate was not mixed. The electrolyte salt was mixed as shown in Table 12. Nonaqueous electrolyte batteries were fabricated in the same manner as in Example 6-1, except for this.

Comparative Examples 6-3 to 6-5

As the halogenated carbonate, 4-fluoro-1,3-dixolan-2-one (FEC) was used. The electrolyte salt was mixed as shown in Table 12. Nonaqueous electrolyte batteries were fabricated in the same manner as in Example 6-1, except for this.

Comparative Examples 6-6 and 6-7

As the halogenated carbonate, 4,5-difluoro-1,3-dioxolan-2-one (DFEC) was used. As the electrolyte salt, only either one of lithium bis(fluorosulfonyl)imide (LiFSI) or lithium hexafluorophosphate (LiPF$_6$) was mixed as shown in Table 12. Nonaqueous electrolyte batteries were fabricated in the same manner as in Example 6-1, except for this.

Comparative Examples 6-8 and 6-9

As the halogenated carbonate, fluoromethyl methyl carbonate (FDMC) was used. As the electrolyte salt, only either one of lithium bis(fluorosulfonyl)imide (LiFSI) or lithium hexafluorophosphate (LiPF$_6$) was mixed as shown in Table 12. Nonaqueous electrolyte batteries were fabricated in the same manner as in Example 6-1, except for this.

Comparative Examples 6-10 and 6-11

As the halogenated carbonate, bis(fluoromethyl) carbonate (DFDMC) was used. As the electrolyte salt, only either one of lithium bis(fluorosulfonyl)imide (LiFSI) or lithium hexafluorophosphate (LiPF$_6$) was mixed as shown in Table 12. Nonaqueous electrolyte batteries were fabricated in the same manner as in Example 6-1, except for this.

Comparative Examples 6-12 and 6-13

As the halogenated carbonate, bis(fluoromethyl) carbonate (DFDMC) was used. As the electrolyte salt, only either one of lithium bis(fluorosulfonyl)imide (LiFSI) or lithium hexafluorophosphate (LiPF$_6$) was mixed as shown in Table 12. Nonaqueous electrolyte batteries were fabricated in the same manner as in Example 6-1, except for this.

Comparative Example 6-12

As the halogenated carbonate, 4-fluoro-1,3-dioxolan-2-one (FEC) was used. As the electrolyte salt, lithium bis(trifluoromethanesulfonyl)imide (LiTFSI) was used as shown in Table 12 in place of lithium bis(fluorosulfonyl)imide (LiFSI), and its mixing amount was set up at 0.05 moles/L. A nonaqueous electrolyte battery was fabricated in the same manner as in Example 6-1, except for this.

Comparative Example 6-13

As the halogenated carbonate, 4-fluoro-1,3-dioxolan-2-one (FEC) was used. As the electrolyte salt, ethanedisulfonyl difluoride (represented by the formula (13)) was used as shown in Table 12 in place of lithium hexafluorophosphate (LiPF$_6$), and its mixing amount was set up at 0.05 moles/L. A nonaqueous electrolyte battery was fabricated in the same manner as in Example 6-1, except for this.

Comparative Example 6-14

The halogenated carbonate was not mixed. A nonaqueous electrolyte battery was fabricated in the same manner as in Example 6-1, except for using, as the electrolyte salt, a mixture of FEC and LiPF$_6$ as shown in Table 12.

Evaluation of Battery
(a) Measurement of shut-off time
(b) Low temperature cycle characteristics
(c) High temperature cycle characteristics The shut-off time, the low temperature cycle characteristics and the high temperature cycle characteristics were evaluated in the same manners as in Example 1.

Configurations of the respective Examples and Comparative Examples are shown in Tables 11 and 12. Also, measurement results are shown in Tables 11 and 12.

TABLE 11

| | Ethylene carbonate Mixing amount [% by volume] | Dimethyl carbonate Mixing amount [% by volume] | Halogenated carbonate Material | Halogenated carbonate Mixing amount [% by volume] | Mixing amount of LiFSI [mole/L] | Mixing amount of LiPF6 [mole/L] | Other additive | Operating time of current shut-off valve [h] | Discharge capacity retention rate [%] Low temperature cycle | Discharge capacity retention rate [%] High temperature cycle |
|---|---|---|---|---|---|---|---|---|---|---|
| Example 6-1 | 24 | 75 | FEC | 1 | 0.01 | 1.09 | — | 710 | 63 | 80 |
| Example 6-2 | 24 | 75 | FEC | 1 | 0.05 | 1.05 | — | 712 | 68 | 82 |
| Example 6-3 | 24 | 75 | FEC | 1 | 0.09 | 1.01 | — | 708 | 69 | 83 |
| Example 6-4 | 24 | 75 | FEC | 1 | 0.3 | 0.8 | — | 598 | 67 | 81 |
| Example 6-5 | 20 | 75 | FEC | 5 | 0.01 | 1.09 | — | 715 | 63 | 79 |
| Example 6-6 | 20 | 75 | FEC | 5 | 0.05 | 1.05 | — | 723 | 69 | 82 |
| Example 6-7 | 20 | 75 | FEC | 5 | 0.09 | 1.01 | — | 713 | 70 | 82 |
| Example 6-8 | 20 | 75 | FEC | 5 | 0.3 | 0.8 | — | 610 | 68 | 81 |
| Example 6-9 | 5 | 75 | FEC | 20 | 0.01 | 1.09 | — | 721 | 63 | 78 |
| Example 6-10 | 5 | 75 | FEC | 20 | 0.05 | 1.05 | — | 730 | 68 | 81 |
| Example 6-11 | 5 | 75 | FEC | 20 | 0.09 | 1.01 | — | 719 | 68 | 81 |
| Example 6-12 | 5 | 75 | FEC | 20 | 0.3 | 0.8 | — | 613 | 66 | 80 |
| Example 6-13 | 20 | 75 | DFEC | 5 | 0.01 | 1.09 | — | 711 | 63 | 78 |
| Example 6-14 | 20 | 75 | DFEC | 5 | 0.05 | 1.05 | — | 720 | 70 | 81 |
| Example 6-15 | 20 | 75 | DFEC | 5 | 0.09 | 1.01 | — | 710 | 71 | 80 |
| Example 6-16 | 20 | 75 | DFEC | 5 | 0.3 | 0.8 | — | 591 | 69 | 79 |
| Example 6-17 | 25 | 70 | FDMC | 5 | 0.01 | 1.09 | — | 716 | 57 | 72 |
| Example 6-18 | 25 | 70 | FDMC | 5 | 0.05 | 1.05 | — | 725 | 64 | 76 |
| Example 6-19 | 25 | 70 | FDMC | 5 | 0.09 | 1.01 | — | 714 | 65 | 76 |
| Example 6-20 | 25 | 70 | FDMC | 5 | 0.3 | 0.8 | — | 612 | 61 | 74 |
| Example 6-21 | 25 | 70 | DFDMC | 5 | 0.01 | 1.09 | — | 720 | 61 | 75 |

TABLE 11-continued

|  | Ethylene carbonate Mixing amount [% by volume] | Dimethyl carbonate Mixing amount [% by volume] | Halogenated carbonate Material | Halogenated carbonate Mixing amount [% by volume] | Mixing amount of LiFSI [mole/L] | Mixing amount of LiPF6 [mole/L] | Other additive | Operating time of current shut-off valve [h] | Discharge capacity retention rate [%] Low temperature cycle | Discharge capacity retention rate [%] High temperature cycle |
|---|---|---|---|---|---|---|---|---|---|---|
| Example 6-22 | 25 | 70 | DFDMC | 5 | 0.05 | 1.05 | — | 728 | 67 | 78 |
| Example 6-23 | 25 | 70 | DFDMC | 5 | 0.09 | 1.01 | — | 718 | 68 | 78 |
| Example 6-24 | 25 | 70 | DFDMC | 5 | 0.3 | 0.8 | — | 619 | 63 | 77 |

TABLE 12

|  | Ethylene carbonate Mixing amount [% by volume] | Dimethyl carbonate Mixing amount [% by volume] | Halogenated carbonate Material | Halogenated carbonate Mixing amount [% by volume] | Mixing amount of LiFSI [mole/L] | Mixing amount of LiPF6 [mole/L] | Other additive | Operating time of current shut-off valve [h] | Discharge capacity retention rate [%] Low temperature cycle | Discharge capacity retention rate [%] High temperature cycle |
|---|---|---|---|---|---|---|---|---|---|---|
| Comparative Example 6-1 | 25 | 75 | No | — | No | 1.1 | — | 416 | 45 | 63 |
| Comparative Example 6-2 | 25 | 75 | No | — | 0.05 | 1.05 | — | 420 | 46 | 64 |
| Comparative Example 6-3 | 20 | 75 | FEC | 5 | No | 1.1 | — | 413 | 47 | 63 |
| Comparative Example 6-4 | 20 | 75 | FEC | 5 | 1.1 | 0 | — | 301 | 7 | 10 |
| Comparative Example 6-5 | 0 | 15 | FEC | 85 | 0.05 | 1.05 | — | 285 | 30 | 50 |
| Comparative Example 6-6 | 20 | 75 | DFEC | 5 | No | 1.1 | — | 298 | 46 | 64 |
| Comparative Example 6-7 | 20 | 75 | DFEC | 5 | 1.1 | 0 | — | 281 | 7 | 9 |
| Comparative Example 6-8 | 25 | 70 | FDMC | 5 | No | 1.1 | — | 305 | 45 | 61 |
| Comparative Example 6-9 | 25 | 70 | FDMC | 5 | 1.1 | 0 | — | 288 | 4 | 8 |
| Comparative Example 6-10 | 25 | 70 | DFDMC | 5 | No | 1.1 | — | 309 | 46 | 62 |
| Comparative Example 6-11 | 25 | 70 | DFDMC | 5 | 1.1 | 0 | — | 293 | 5 | 9 |
| Comparative Example 6-12 | 20 | 75 | FEC | 5 | No | 1.05 | LiTFSI 0.05 moles/L | 420 | 45 | 67 |
| Comparative Example 6-13 | 20 | 75 | FEC | 5 | No | 1.1 | Formula (13) 0.05 moles/L | 420 | 40 | 66 |
| Comparative Example 6-14 | 20 | 75 | No | — | 0.05 | 1.05 | VC 5% | 370 | 35 | 67 |

As is noted from Tables 11 and 12, even in the case of using an alloy based negative electrode as the negative electrode, the high battery characteristics could be kept. In particular, an effect for prolonging the operating time of the current shut-off valve was high, and as to the cycle characteristics, a sufficient cycle enhancing effect could also be obtained as compared with the Comparative Examples.

Example 7

In Example 7, the battery characteristics were evaluated using an imide salt having an asymmetric structure.

Examples 7-1 to 7-8

A mixture of ethylene carbonate (EC), dimethyl carbonate (DMC) and 4-fluoro-1,3-dioxolan-2-one (FEC) in a proportion of 20/75/5 in terms of a volume ratio was used as the nonaqueous solvent. As the electrolyte salt, a mixture of lithium (fluorosulfonyl)(trifluoromethylsulfonyl)imide represented by the formula (5) and lithium hexafluorophosphate (LiPF$_6$) in mixing amounts shown in Table 13 was dissolved in the nonaqueous solvent to prepare a nonaqueous electrolytic solution. Nonaqueous electrolyte batteries were fabricated in the same manner as in Example 1-1, except for this.

Comparative Examples 7-1 and 7-2

As the nonaqueous solvent, the halogenated carbonate was not mixed. As the electrolyte salt, lithium (fluorosulfonyl)(trifluoromethylsulfonyl)imide represented by the formula (5) and lithium hexafluorophosphate (LiPF$_6$) were mixed as shown in Table 13. Nonaqueous electrolyte batteries were fabricated in the same manner as in Example 7-1, except for this.

Comparative Examples 7-3 and 7-4

As the electrolytic solution, the mixing ratio of the nonaqueous solvent was set up at 20/75/5 in terms of a ratio of ethylene carbonate (EC) to dimethyl carbonate (DMC) to 4-fluoro-1,3-dioxolan-2-one (FEC). As the electrolyte salt, only either one of lithium bis(fluorosulfonyl)imide (LiFSI) or lithium hexafluorophosphate (LiPF$_6$) was mixed and used. The mixing ratio is shown in Table 13.

Comparative Example 7-5

As the nonaqueous solvent, ethylene carbonate (EC) was not mixed, and a mixture of dimethyl carbonate (DMC) and 4-fluoro-1,3-dioxolan-2-one (FEC) in a ratio of 15/85 was used. As the electrolyte salt, both of lithium bis(fluorosulfonyl)imide (LiFSI) and lithium hexafluorophosphate (LiPF$_6$) as shown in Table 13 were mixed and used. A nonaqueous electrolyte battery was fabricated in the same manner as in Example 7-1, except for this.

Comparative Examples 7-6 and 7-7

As to the electrolytic solution, the mixing ratio of the nonaqueous solvent was set up at 20/75/5 in terms of a ratio of ethylene carbonate (EC) to dimethyl carbonate (DMC) to 4-fluoro-1,3-dioxolan-2-one (FEC). Also, as the electrolyte salt, LiFSI was not added, and as other imide salts, lithium bis(trifluoromethanesulfonyl)imide (LiTFSI) and ethanedisulfonyl difluoride represented by the formula (13) were added in concentrations of 0.05 moles/L, respectively.

Comparative Example 7-8

As the nonaqueous solvent, vinylene carbonate (VC) was mixed in place of FEC which is the halogenated carbonate. As other composition, one shown in Table 13 was used, thereby fabricating a nonaqueous electrolyte battery.

Evaluation of Battery (a) Measurement of shut-off time (b) Low temperature cycle characteristics (c) High temperature cycle characteristics The shut-off time, the low temperature cycle characteristics and the high temperature cycle characteristics were evaluated in the same manners as in Example 1.

Configurations of the respective Examples and Comparative Examples are shown in Table 13. Also, measurement results are shown in Table 13.

TABLE 13

| | Ethylene carbonate Mixing amount [% by volume] | Dimethyl carbonate Mixing amount [% by volume] | Halogenated carbonate Material | Halogenated carbonate Mixing amount [% by volume] | Mixing amount of LiFSI [mole/L] | Mixing amount of LiPF6 [mole/L] | Other additive | Operating time of current shut-off valve [h] | Discharge capacity retention rate [%] Low temperature cycle | Discharge capacity retention rate [%] High temperature cycle |
|---|---|---|---|---|---|---|---|---|---|---|
| Example 7-1 | 20 | 75 | FEC | 5 | 0.001 | 1.099 | — | 515 | 54 | 77 |
| Example 7-2 | 20 | 75 | FEC | 5 | 0.01 | 1.09 | — | 813 | 75 | 85 |
| Example 7-3 | 20 | 75 | FEC | 5 | 0.02 | 1.08 | — | 836 | 80 | 86 |
| Example 7-4 | 20 | 75 | FEC | 5 | 0.05 | 1.05 | — | 824 | 80 | 86 |
| Example 7-5 | 20 | 75 | FEC | 5 | 0.09 | 1.01 | — | 806 | 81 | 87 |
| Example 7-6 | 20 | 75 | FEC | 5 | 0.1 | 1.1 | — | 673 | 79 | 84 |
| Example 7-7 | 20 | 75 | FEC | 5 | 0.3 | 0.8 | — | 547 | 72 | 80 |
| Example 7-8 | 20 | 75 | FEC | 5 | 0.5 | 0.6 | — | 502 | 54 | 77 |
| Comparative Example 7-1 | 25 | 75 | No | — | No | 1.1 | — | 488 | 50 | 66 |
| Comparative Example 7-2 | 20 | 75 | No | — | 0.05 | 1.05 | — | 488 | 51 | 67 |
| Comparative Example 7-3 | 20 | 75 | FEC | 5 | No | 1.1 | — | 476 | 52 | 66 |
| Comparative Example 7-4 | 20 | 75 | FEC | 5 | 1.1 | 0 | — | 354 | 10 | 15 |
| Comparative Example 7-5 | 0 | 15 | FEC | 85 | 0.05 | 1.05 | — | 295 | 36 | 55 |
| Comparative Example 7-6 | 20 | 75 | FEC | 5 | No | 1.05 | LiTFSI 0.05 moles/L | 498 | 50 | 72 |
| Comparative Example 7-7 | 20 | 75 | FEC | 5 | No | 1.1 | Formula (13) 0.05 moles/L | 496 | 46 | 74 |
| Comparative Example 7-8 | 20 | 55 | NO | — | 0.05 | 1.05 | VC 5% | 375 | 51 | 67 |

As is noted from Table 13, even in the case of jointly using lithium (fluorosulfonyl)(trifluoromethylsulfonyl)imide represented by the formula (5) and lithium hexafluorophosphate (LiPF$_6$) as the electrolyte salt, the same battery characteristics as those in the case of using LiFSI could be obtained. Also, even in this case, by mixing the halogenated carbonate in the nonaqueous solvent, not only the low temperature cycle characteristics and the high temperature cycle characteristics could be enhanced, but the operating time of the current shut-off valve could be prolonged.

While the present application has been described with reference to specific embodiments thereof, it should not be construed that the present application is limited to the foregoing embodiments, and various changes and modifications can be made herein on the basis of the technical thoughts of the present application.

The materials of the positive electrode, negative electrode and separator and the like are merely an example, and it should not be construed that the present application is limited thereto.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A nonaqueous electrolyte comprising:
a nonaqueous solvent consisting essentially of a cyclic carbonate selected from the group consisting of ethylene carbonate, propylene carbonate, and a mixture thereof, a chain carbonate, and 0.1% by volume or more and not more than 50% by volume of at least one member selected from the group consisting of a halogen element-containing chain carbonate represented by the following formula (1) and a halogen element-containing cyclic carbonate represented by the following formula (2), a mixing ratio of the cyclic carbonate to the chain carbonate in the solvent ranging from 5/95 to 45/55, the nonaqueous solvent being substantially free or lactone; and
an electrolyte salt containing a compound represented by the following formula (3) in an amount of 0.001 moles/L or more and not more than 0.5 moles/L relative to the nonaqueous solvent

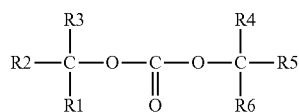 (1)

wherein
each of R1 to R6 represents a hydrogen group, a halogen group, an alkyl group or a halogenated alkyl group, provided that at least one of R1 to R6 represents a halogen group or a halogenated alkyl group,

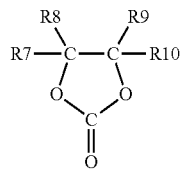 (2)

wherein
each of R7 to R10 represents, a hydrogen group, a halogen group, an alkyl group or a halogenated alkyl group, provided that at least one of R7 to R10 represents a halogen group or a halogenated alkyl group, and $M^+[(ZY)_2N]^-$ (3)

wherein
M represents a monovalent cation; Y represents $SO_2$ or CO; and each Z independently represents a fluorine atom or an organic group which may contain at least one polymerizable functional group and which may be perfluorinated, provided that at least one Z represents a fluorine atom.

2. The nonaqueous electrolyte according to claim 1, wherein
the compound represented by the formula (3) is at least one member selected from the group consisting of lithium bis(fluorosulfonyl)imide represented by the following formula (4) and lithium (fluorosulfonyl)(trifluoromethylsulfonyl)imide represented by the following formula (5)

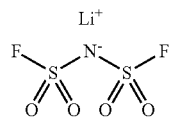 (4)

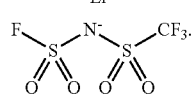 (5)

3. The nonaqueous electrolyte according to claim 1, wherein
the halogen element-containing chain carbonate is at least one member selected from the group consisting of fluoromethyl methyl carbonate and bis(fluoromethyl) carbonate.

4. The nonaqueous electrolyte according to claim 1, wherein
the halogen element-containing cyclic carbonate is at least one member selected from the group consisting of 4-fluoro-1,3-dioxolan-2-one and 4,5-difluoro-1,3-dioxolan-2-one.

5. A nonaqueous electrolyte battery comprising:
a positive electrode,
a negative electrode, and
an nonaqueous electrolyte, wherein
the nonaqueous electrolyte includes
a nonaqueous solvent consisting essentially of a cyclic carbonate selected from the group consisting of ethylene carbonate, propylene carbonate, and a mixture thereof, a chain carbonate, and 0.1% by volume or more and not more than 50% by volume of at least one member selected from the group consisting of a halogen element-containing chain carbonate represented by the following formula (1) and a halogen element-containing cyclic carbonate represented by the following formula (2), a mixing ratio of the cyclic carbonate to the chain carbonate in the solvent ranging from 5/95 to 45/55, the nonaqueous solvent being substantially free or lactone; and
an electrolyte salt containing a compound represented by the following formula (3) in an amount of 0.001 moles/L or more and not more than 0.5 moles/L relative to the nonaqueous solvent

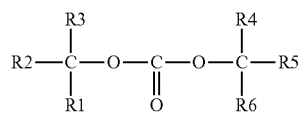 (1)

wherein
each of R1 to R6 represents a hydrogen group, a halogen group, an alkyl group or a halogenated alkyl group, provided that at least one of R1 to R6 represents a halogen group or a halogenated alkyl group,

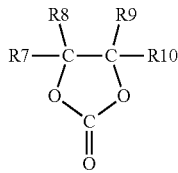 (2)

wherein
each of R7 to R10 represents, a hydrogen group, a halogen group, an alkyl group or a halogenated alkyl group, provided that at least one of R7 to R10 represents a halogen group or a halogenated alkyl group, and $$M^+[(ZY)_2N]^- \quad (3)$$

wherein
M represents a monovalent cation; Y represents $SO_2$ or CO; and each Z independently represents a fluorine atom or an organic group which may contain at least one polymerizable functional group and which may be perfluorinated, provided that at least one Z represents a fluorine atom.

6. The nonaqueous electrolyte battery according to claim 5, wherein
the compound represented by the formula (3) is at least one member selected from the group consisting of lithium bis(fluorosulfonyl)imide represented by the following formula (4) and lithium (fluorosulfonyl)(trifluoromethylsulfonyl)imide represented by the following formula (5)

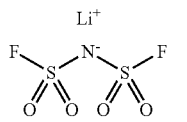 (4)

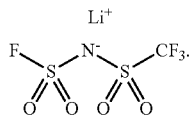 (5)

7. The nonaqueous electrolyte battery according to claim 5, wherein
the halogen element-containing chain carbonate is at least one member selected from the group consisting of fluoromethyl methyl carbonate and bis(fluoromethyl) carbonate.

8. The nonaqueous electrolyte battery according to claim 5, wherein
the halogen element-containing cyclic carbonate is at least one member selected from the group consisting of 4-fluoro-1,3-dioxolan-2-one and 4,5-difluoro-1,3-dioxolan-2-one.

9. The nonaqueous electrolyte battery according to claim 5, wherein
the negative electrode contains, as a negative electrode active material, at least one member selected from the group consisting of a carbon material, silicon, an alloy of silicon, a compound of silicon, tin, an alloy of tin, and a compound of tin.

\* \* \* \* \*